United States Patent
Metz et al.

(10) Patent No.: US 7,654,371 B1
(45) Date of Patent: Feb. 2, 2010

(54) HOLD OPEN ROD WITH ROTATABLY MOUNTED PAWLS AS LOCKING MEMBERS AND A SNUBBER

(75) Inventors: Joseph Ray Metz, Ridgefield, CT (US); Joseph Koskelowsky, Danbury, CT (US); John Boscia, Ridgefield, CT (US); Richard Lutterman, Danbury, CT (US); Thomas Chiaramonte, Newtown, CT (US); Donald Brundage, Stratford, CT (US)

(73) Assignee: Triumph Actuation Systems - Connecticut, LLC, Bloomfield, CT (US)

( * ) Notice: Subject to any disclaimer, the term of this patent is extended or adjusted under 35 U.S.C. 154(b) by 701 days.

(21) Appl. No.: 11/155,921

(22) Filed: Jun. 18, 2005

(51) Int. Cl.
*F16F 9/32* (2006.01)
(52) U.S. Cl. ............... 188/300; 267/255; 403/109.1
(58) Field of Classification Search ............... 188/300; 267/255; 403/108, 109.1, 109.3, 109.5, 103, 403/317, 327, 328
See application file for complete search history.

(56) References Cited

U.S. PATENT DOCUMENTS

| | | | |
|---|---|---|---|
| 3,367,689 A | 2/1968 | McCarthy | |
| 3,390,874 A | 7/1968 | McCarthy | |
| 3,442,541 A | 5/1969 | Metz | |
| 3,469,871 A | 9/1969 | Betts | |
| 3,945,744 A | 3/1976 | Metz | |
| 4,014,467 A | 3/1977 | Ferguson | |
| 4,362,415 A | 12/1982 | Metz et al. | |
| 4,366,945 A | 1/1983 | Blauenstein | |
| 4,453,449 A | 6/1984 | Hollmann | |
| 4,453,748 A | 6/1984 | Ekman | |
| 4,546,956 A | 10/1985 | Moberg | |
| 4,644,617 A * | 2/1987 | Tupper et al. | 24/611 |
| 4,682,795 A | 7/1987 | Rabushka et al. | |
| 4,960,344 A | 10/1990 | Geisthoff et al. | |
| 5,066,049 A | 11/1991 | Staples | |
| 5,265,970 A | 11/1993 | LaBarre | |
| 5,366,313 A | 11/1994 | LaBarre | |
| 5,579,875 A | 12/1996 | Vargas et al. | |
| 5,632,568 A | 5/1997 | Fechter | |
| 5,779,385 A | 7/1998 | Fechter | |
| 5,950,997 A | 9/1999 | Metz | |

* cited by examiner

*Primary Examiner*—Pam Rodriguez
(74) *Attorney, Agent, or Firm*—Clement A. Berard, Esq.; Dann, Dorfman, Herrell & Skillman, PC

(57) ABSTRACT

In a preferred embodiment, an apparatus, including; telescoping inner and outer members; a release collar circumferentially encircling the outer member; at least one rotatably mounted pawl disposed in the outer member; the at least one rotatably mounted pawl being depressed into at least a first depression formed circumferentially in the inner member by the release collar; and the at least one rotatably mounted pawl being movable between unlocked and locked positions. A vibration damper for the hold open rod is also provided.

17 Claims, 24 Drawing Sheets

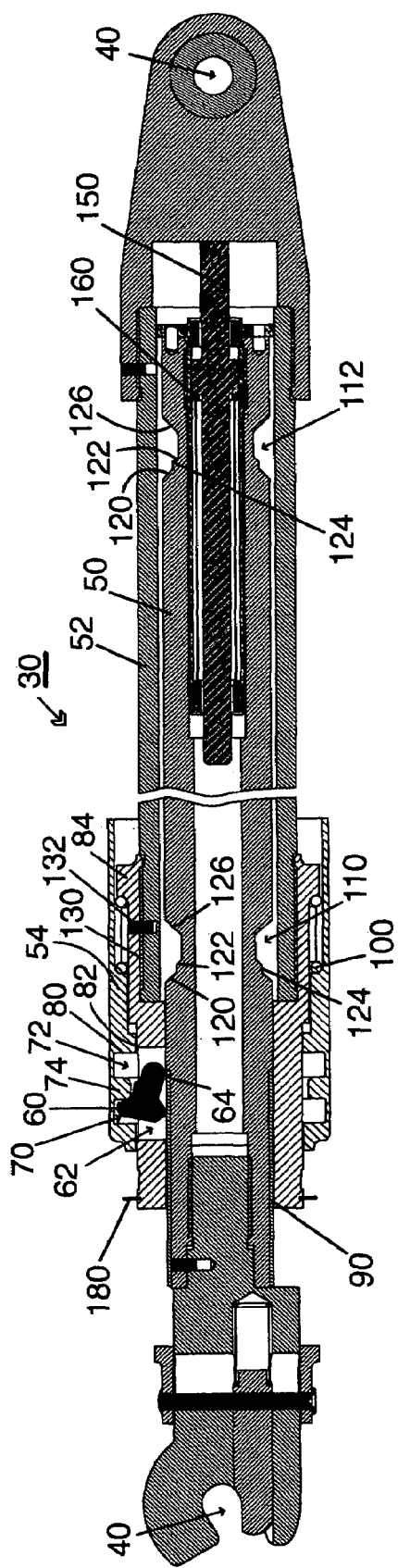
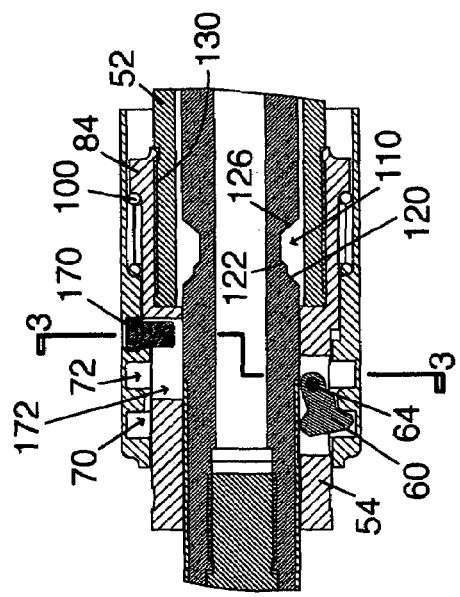
FIGURE 1
FIGURE 2

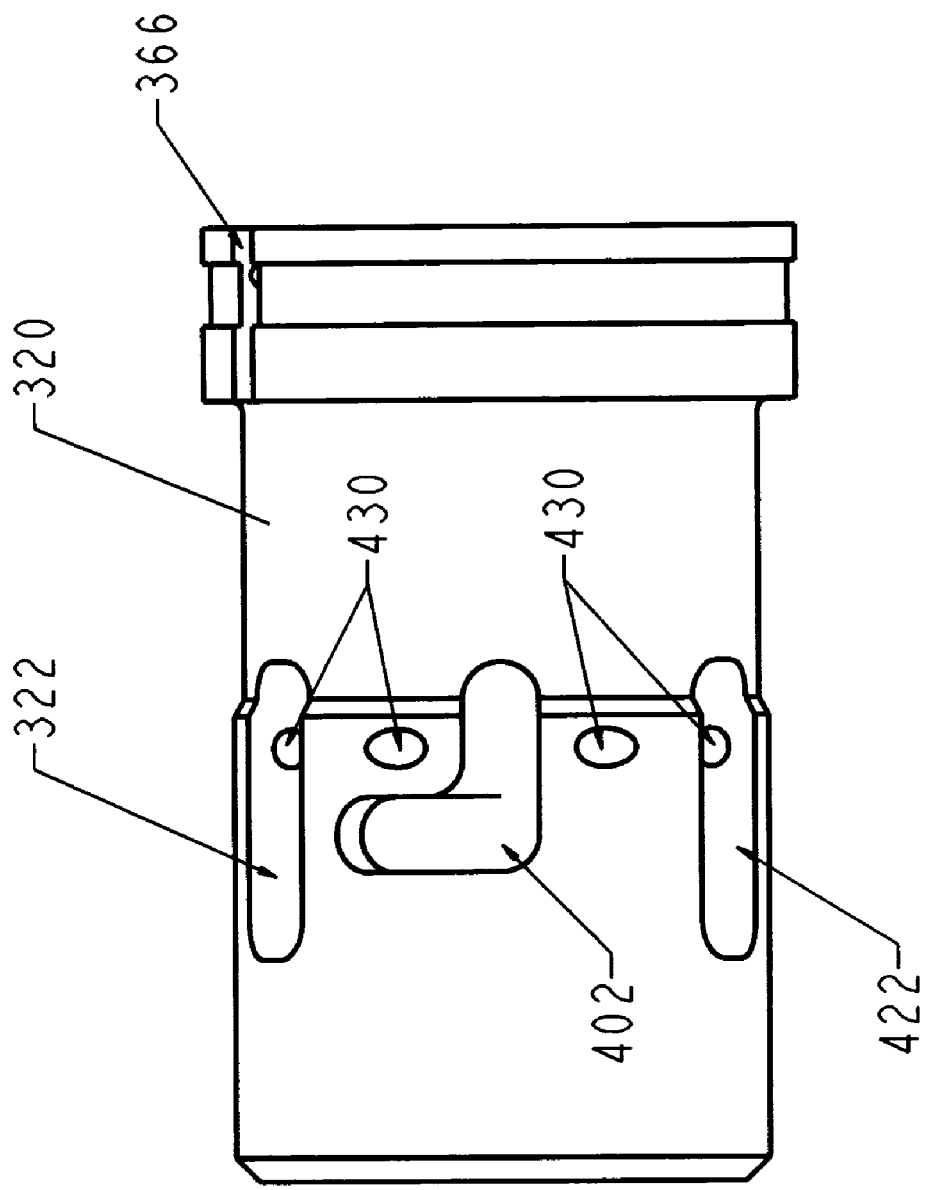

HOLD OPEN ROD WITH ROTATABLY MOUNTED PAWLS AS LOCKING MEMBERS AND A SNUBBER

BACKGROUND OF THE INVENTION

1. Field of the Invention

The present invention relates to hold open rods generally and, more particularly, but not by way of limitation, to a novel hold open rod that employs rotatably mounted pawls as locking members and a snubber.

2. Background Art

The following patents are known:

U.S. Pat. No. 3,367,689, issued Feb. 6, 1968, to McCarthy, and titled ADJUSTABLE STRUT, discloses a lengthwise adjustable strut that uses a dumbbell-shaped, loose member as a locking member.

U.S. Pat. No. 3,390,874, issued Jul. 2, 1968, to McCarthy, and titled TELESCOPIC STRUT, discloses a lengthwise adjustable strut that uses a cylindrical, loose member as a locking member.

U.S. Pat. No. 3,442,541, issued May 6, 1969, to Metz, and titled RELEASABLE FASTENER, discloses a lengthwise adjustable strut that uses a toothed, radially movable, loose member as a locking member.

U.S. Pat. No. 3,469,871, issued Sep. 30, 1969, to Betts, and titled RELEASABLE LOCKING DEVICE, discloses a lengthwise adjustable strut that uses one or more loose members as locking members.

U.S. Pat. No. 3,945,744, issued Mar. 23, 1976, to Metz and titled TELESCOPING STRUT CONSTRUCTION, discloses a lengthwise adjustable strut that uses one or more loose dogs as locking members.

U.S. Pat. No. 4,014,467, issued Mar. 29, 1977, to Ferguson, and titled DISHWASHER AND COUPLING, discloses a lengthwise adjustable coupling that uses one or more loose balls as coupling members.

U.S. Pat. No. 4,362,415, issued Dec. 7, 1982, to Metz et al., and titled EXTENSIBLE AND RETRACTABLE STRUT WITH SAFETY LATCH, discloses a lengthwise adjustable strut that uses a spring-loaded lever as a locking member.

U.S. Pat. No. 4,366,945, issued Jan. 4, 1983, to Blaüenstein, and titled HOSE COUPLING WITH DOUBLE LOCK, discloses a hose coupling that uses one or more loose balls as locking elements.

U.S. Pat. No. 4,453,449, issued Jun. 12, 1984, to Hollmann, and titled HOLDING APPARATUS, discloses a lengthwise adjustable holding apparatus that uses one or more loose balls as locking members.

U.S. Pat. No. 4,453,748, issued Jun. 12, 1984, to Ekman, and titled QUICK-COUPLING MEMBER, discloses a quick-coupling that uses one or more loose balls as locking members.

U.S. Pat. No. 4,546,956, issued Oct. 15, 1985, to Moberg, and titled COMPRESSED AIR COUPLING, discloses a compressed air coupling that uses one or more loose balls as locking members.

U.S. Pat. No. 4,682,795, issued Jul. 28, 1987, to Rabushka et al., and titled TENSION ACTUATED UNCOUPLER, discloses an uncoupler that uses one or more loose balls as locking members.

U.S. Pat. No. 4,960,344, issued Oct. 2, 1990, to Geisthoff et al., and titled LOCKING MECHANISM FOR FIXING AN OUTER PART ON AN INNER PART, discloses a lengthwise adjustable part that uses one or more loose balls as locking members.

U.S. Pat. No. 5,066,049, issued Nov. 19, 1991, to Staples, and titled LOCKOUT DEVICE FOR HOSE FITTING, discloses a hose fitting that uses one or more loose balls as locking members.

U.S. Pat. No. 5,265,970, issued Nov. 30, 1993, to LaBarre, and titled STRUT CONSTRUCTION, discloses a lengthwise adjustable strut that uses one or more loose balls as locking members.

U.S. Pat. No. 5,366,313, issued Nov. 22, 1994, to LaBarre, and titled STRUT CONSTRUCTION, discloses a lengthwise adjustable strut that uses one or more loose balls as locking members.

U.S. Pat. No. 5,579,875, issued Dec. 3, 1996, to Vargas et al., and titled SELF LOCKING STRUT, describes a lengthwise adjustable strut that uses spring-loaded pins as locking members.

U.S. Pat. No. 5,632,568, issued May 27, 1997, to Fechter, and titled AUTOMATIC UNCOCKING SHAFT SENSING COUPLER, discloses an uncocking shaft sensing coupler that uses one or more loose dogs or balls as locking members.

U.S. Pat. No. 5,779,385, issued Jul. 14, 1998, to Fechter, and titled AUTOMATIC UNCOCKING SHAFT SENSING COUPLER, discloses an uncocking shaft sensing coupler that uses one or more loose dogs or balls as locking members.

U.S. Pat. No. 5,950,997, issued Sep. 14, 1999, to Metz, and titled TELESCOPING STRUT CONSTRUCTION, discloses a lengthwise adjustable three-member strut that uses one or more loose locking dogs and a spring-loaded member as locking members.

In connection with most prior hold open rods or struts, there have existed significant problems involving inadvertent release under load. Specifically, with either compressive or tensile loads applied between the telescoping members of the prior art hold open rods or struts, there was a danger that the operator could accidentally slide the locking collar to a release position while the hold open rod or strut was still under load, possibly leading to a sudden collapse of the hold open rod or strut and an accompanying uncontrollable swing or fall of the component being held by virtue of its own weight. Such a condition was capable of causing serious injury or death to either the operator or other personnel in the area.

In the past, hold open rods or struts of the type noted have been used with aircraft cowlings, in order to retain the cowlings in an open position as during maintenance, and/or servicing of the aircraft engine. Depending on the size of the aircraft, such cowlings can weigh hundreds of pounds, and the potential of injury resulting from being struck by an inadvertently released cowling can be readily appreciated if one considers structures of such magnitude and size.

The more recently issued patents address this problem and require that a compressive load be removed, mechanically or manually, from the hold open rod or strut before the release collar can be moved and the hold open rod or strut thereafter collapsed. None of the cited patents require that the release mechanism be rotated a significant degree before the hold open rod can be collapsed. Such devices also still employ loose balls or dogs as the locking members and fail to address the following problems:

In an intermediate position, the prior art hold open rods or struts do not offer locking under tensile loads.

Because the dogs are loosely retained, instances occur when the dogs actually roll over within their slots, causing jamming and non-lockup conditions. These instances can occur particularly under extreme vibration situations.

Due to a point contact of the dogs to the inner tube, there is less holding capacity than if a line contact were provided.

Because of the loose balls and dogs, there is more wear on the inner tube and release collar under vibration.

Because the loose balls and dogs can fall out, the devices offer less than failsafe designs.

None of the forgoing patents discloses the use of one or more rotatably mounted pawls as locking members.

Accordingly, it is a principal object of the present invention to provide a hold open rod that offers locking in the intermediate position under tensile loads.

It is a further object of the invention to provide such a hold open rod that prevents the locking members from rolling over within their slots.

It is an additional object of the invention to provide such a hold open rod that provides a line contact between the locking members thereof and the surface on which they ride, thus offering more holding capacity.

It is another object of the invention to provide such a hold open rod that provides locking members that are not loose.

A further object of the invention is to provide such a hold open rod in which the locking members thereof cannot fall out, thus providing a more failsafe design.

An additional object of the invention is to provide such a hold open rod with a vibration snubber as part of thereof.

Another object of the invention is to provide such a hold open rod that cannot be collapsed before rotating the release mechanism thereof a significant degree.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, an apparatus, comprising; telescoping inner and outer members; a release collar circumferentially encircling said outer member; at least one rotatably mounted pawl disposed in said outer member; and said at least one rotatably mounted pawl being depressed into at least a first depression formed circumferentially in said inner member by said release collar; and said at least one rotatably mounted pawl being movable between unlocked and locked positions. A vibration damper for said hold open rod is also provided.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which:

FIG. 1 is a side elevational view, in cross-section, of a hold open rod constructed according to one embodiment of the present invention in unlocked and stowed position.

FIG. 2 is a fragmentary, side elevational view, in cross-section, rotated 30 degrees from FIG. 1.

FIG. 26 is a top plan view of the lock body of the embodiment of FIG. 18 showing, inter alia, the J-slot.

DETAILED DESCRIPTION OF THE PREFERRED EMBODIMENTS

Figure 3:
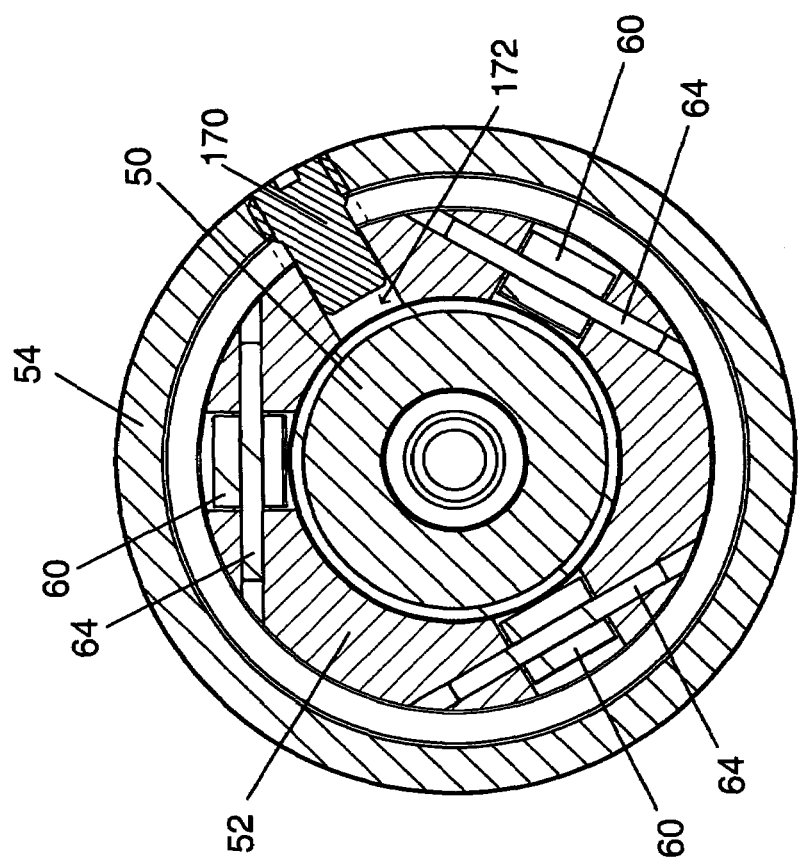
FIG. 3 is an end elevational view taken along line "3-3" of FIG. 2, but in the orientation shown on FIG. 1.

Reference should now be made to the drawing figures on which similar or identical elements are given consistent identifying numerals throughout the various figures thereof, and on which parenthetical references to figure numbers, when used, direct the reader to the view(s) on which the element(s) being described is (are) best seen, although the element(s) may be seen on other figures also.

FIG. 1 illustrates a hold open rod, constructed according to one embodiment of the present invention, and generally indicated by the reference numeral 30 in an unlocked and stowed position. Hold open rod 30 has conventional attachment points 40 at either end thereof Since attachment points are conventional, no further description thereof will be made. It will be understood that the terms "horizontal" and "vertical" when used herein refer to the positions of the elements being described shown on the drawing figures and other orientations of the elements may be provided as well.

Hold open rod 30 has elongated, horizontal, nested, cylindrical inner and outer members 50 and 52, respectively, and slidably mounted on an extension 84 of the outer member is a horizontal cylindrical release collar 54. Three pawls 60 (only one visible on FIG. 1), spaced 120 degrees apart, are rotatably disposed in outer member 52, each is disposed in a socket 62, and each is disposed on a shaft 64. Defined in release collar 54 are circumferentially extending unlocking and locking channels 70 and 72, respectively, separated by a two-sided, vertical wall 74. A vertical wall 80 defines the distal end of locking channel 72 and a horizontal wall 82 formed at the base of locking channel 72 rides on a portion of extension 84.

As indicated above, hold open rod 30 is in its unlocked position, with pawl 60 protruding into unlocking channel 70 and resting on a wear sleeve 90 disposed on inner member 50. A compression spring 100 is disposed between release collar 54 and extension 84. First and second depressions 110 and 112 are circumferentially defined in inner member 50. Each depression 110 and 112 has an inwardly sloping left wall, with an upper portion 120 and a lower portion 122 joined by a horizontal ledge 124, and an inwardly sloping right wall 126. Outer member 54 and extension 84 are joined by a horizontal threaded portion 130 and a vertical pin 132. The purposes of pawls 60 and depressions 110 and 112 are discussed in detail infra.

In the position shown, an end of a horizontal pin 150 bears on an inner surface of connection 40 at the right end (as shown on FIG. 1) of hold open rod 30. A spring 160 is disposed between pin 150 and inner member 50. Pin 150 is arranged such that it leaves contact with the inner surface of connection 40 as inner member 50 is partially withdrawn from outer member 52. The purpose of spring-loaded pin 150 is to absorb vibrations when hold open rod 30 is in its stowed position.

FIG. 2 illustrates that the horizontal travel of release collar 54 is limited by a vertical pin 170 threadingly inserted through release collar 54 and extending into a slot formed in extension 84. Alternatively, a vertical split ring collar 180 (FIG. 1) may be provided to limit the degree of travel of release collar 54.

FIG. 3 illustrates the location of pin 170 threadingly inserted through release collar 54 and extending into slot 172 and illustrates all three pawls 60 disposed on shafts 64 fixedly embedded in outer member 52.

Figure 4:
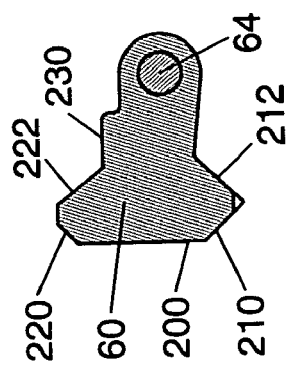
FIG. 4 is a side elevational view of a pawl according to the embodiment of FIG. 1.

FIG. 4 illustrates pawl 60 in a horizontal position and shows that pawl terminates at its distal end in a vertical wall 200. Depending from a distal end of pawl 60 is a pointed protuberance formed by sloped walls 210 and 212, with wall 210 depending from vertical wall 200 and with wall 212 depending from a point intermediate vertical wall 200 and shaft 64. An upwardly extending, truncated point is formed by wall 220 extending upwardly from vertical wall 200 and by wall 222 extending upwardly from a point intermediate the vertical wall and shaft 64. A horizontal wall 230 extends from the base of wall 222 almost to shaft 64.

Figure 5:
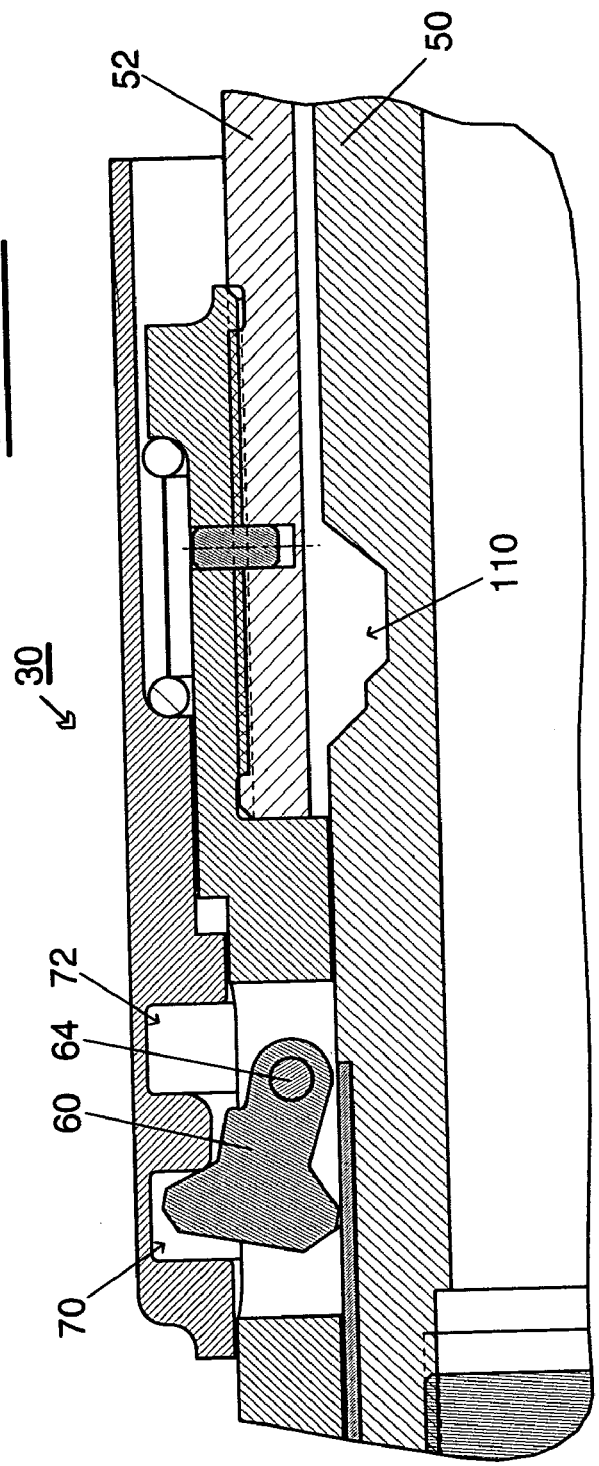
FIGS. 5-17 are fragmentary side elevational views, illustrating the steps in locking and unlocking the release collar for compression and tension loads for the embodiment of FIG. 1.

FIG. 5 illustrates hold open rod 30 in its unlocked and stowed position (FIG. 1).

Figure 6:
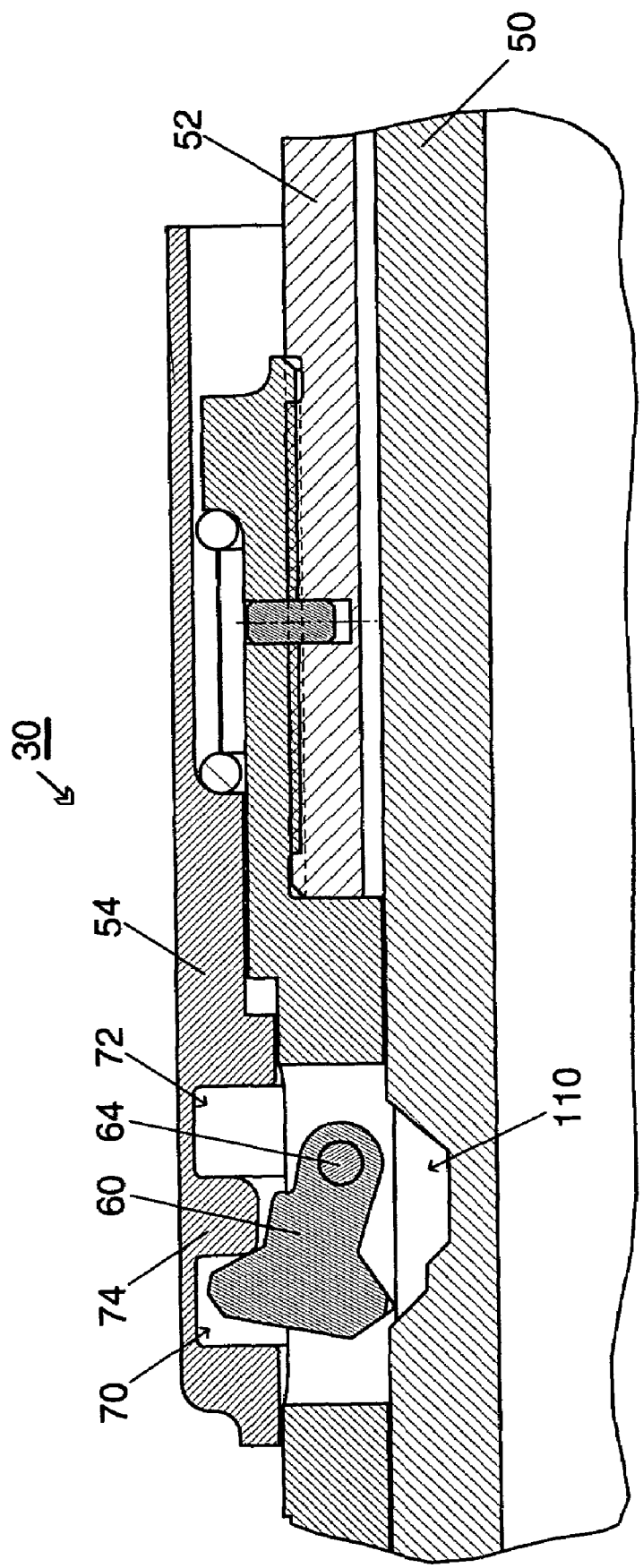

FIG. 6 illustrates that inner member 50 has been pulled out of outer member 52 so that depression 110 underlies pawl 60 and release collar 54 has begun to be manually moved to the left on the figure. It will be assumed for illustration purposes that depression 110 will be used. Should hold open rod be extended fully, depression 112 would be used in the same manner as depression 110.

Figure 7:
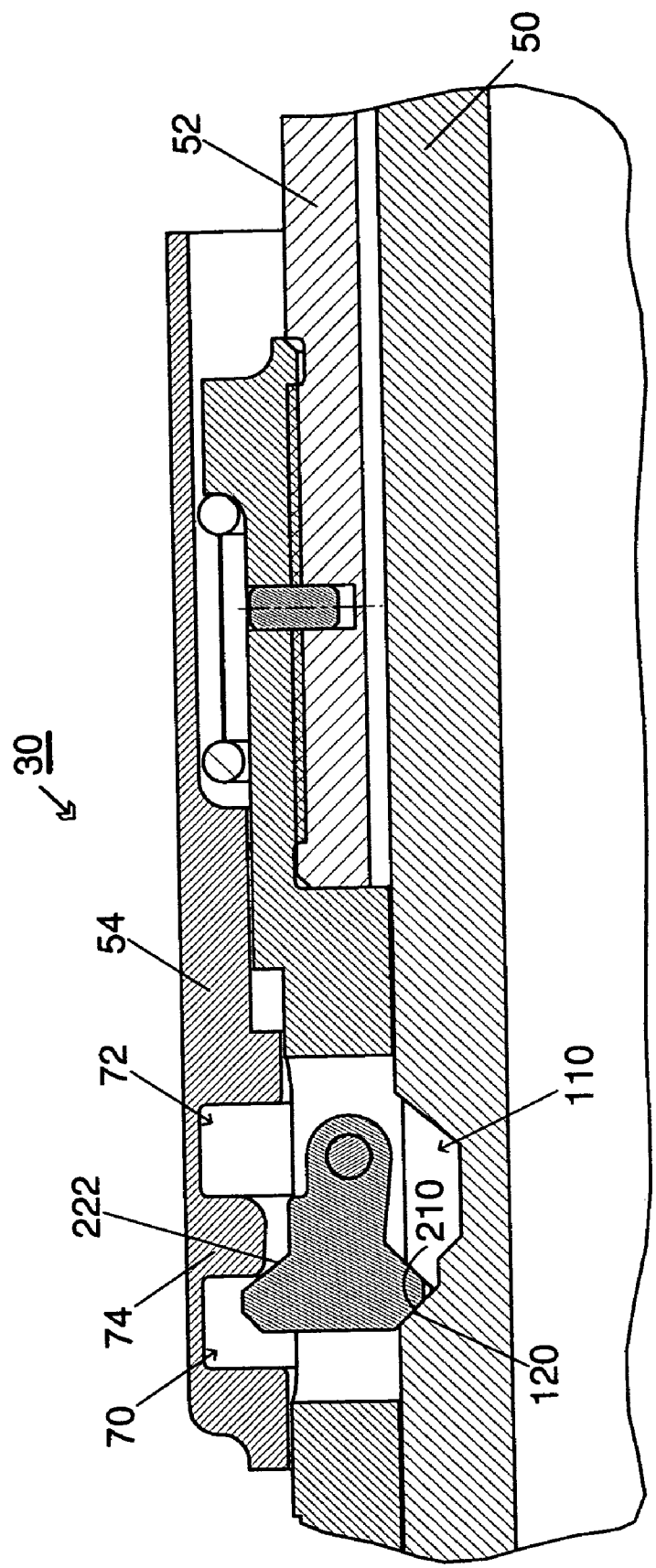

FIG. 7 illustrates that release collar 54 has been mover further to the left, such that a corner of wall 74 has pushed pawl 60 downwardly so that wall 120 of depression 110 temporarily engages wall 222 of the pawl.

Figure 8:
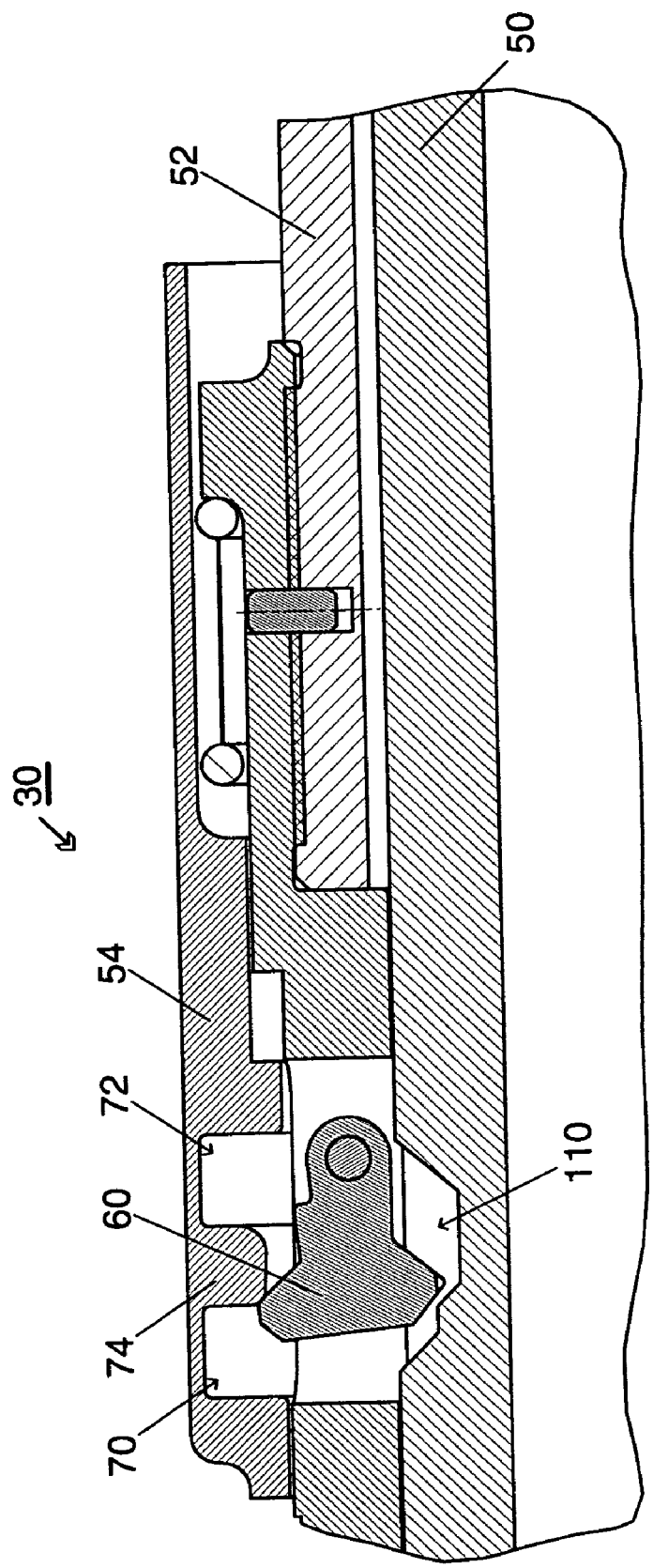

FIG. 8 illustrates inner member 50 has been pulled out further from outer member 52.

Figure 9:
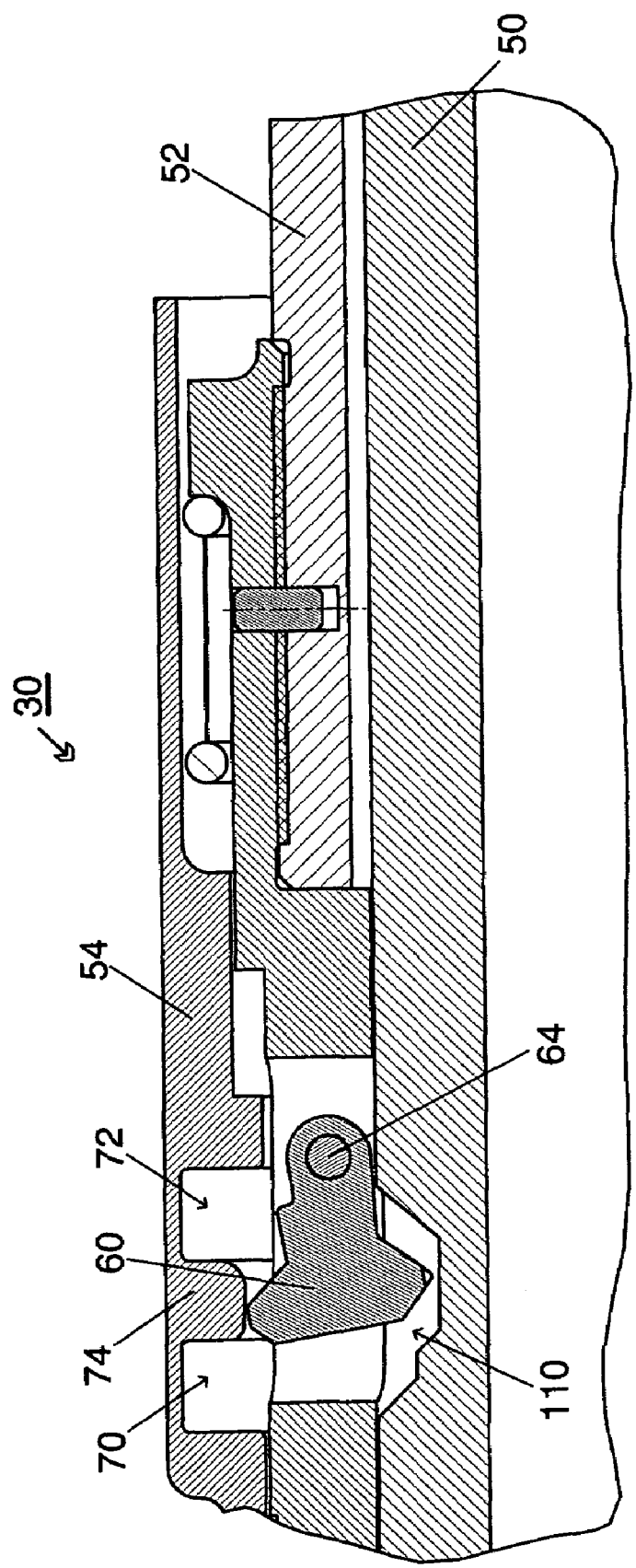

FIG. 9 illustrates that release collar 54 has been moved further to the left, with wall 74 thus pressing pawl 60 further downwardly.

Figure 10:
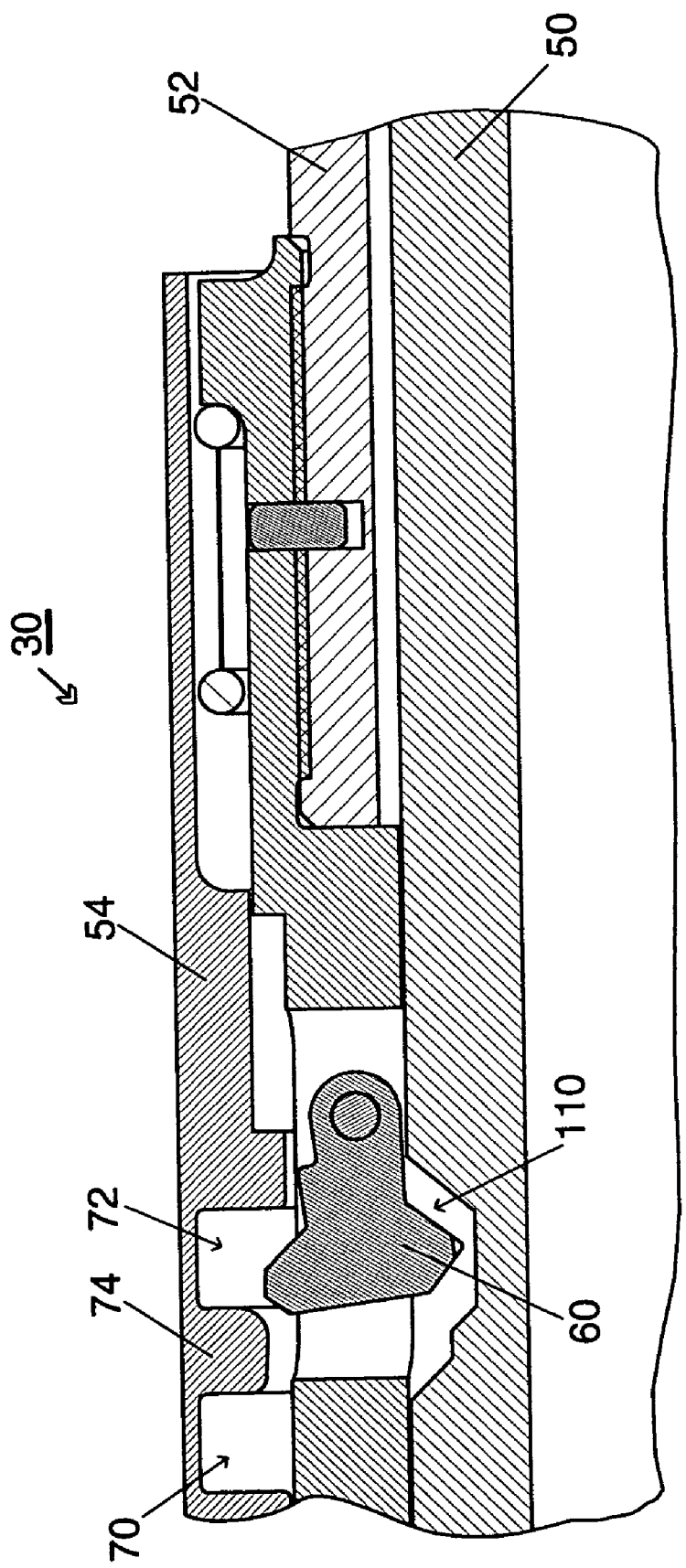

FIG. 10 illustrates that release collar 54 has been moved leftwardly to its locked position and the upper portion of pawl 60 has entered locking channel 72.

Figure 11:
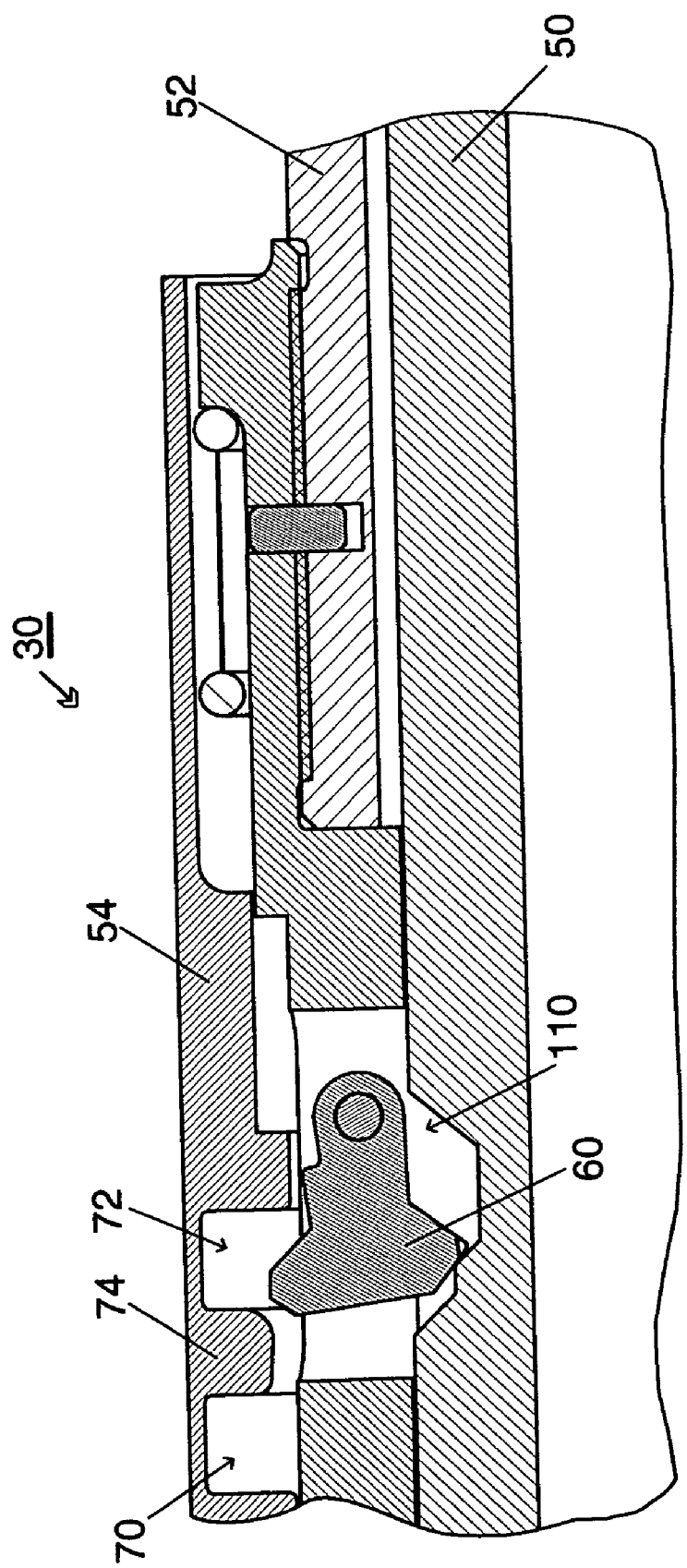

FIG. 11 illustrates that a compressive load has been applied and has moved inner member 50 to the right on FIG. 11, thus raising pawl 60.

Figure 12:
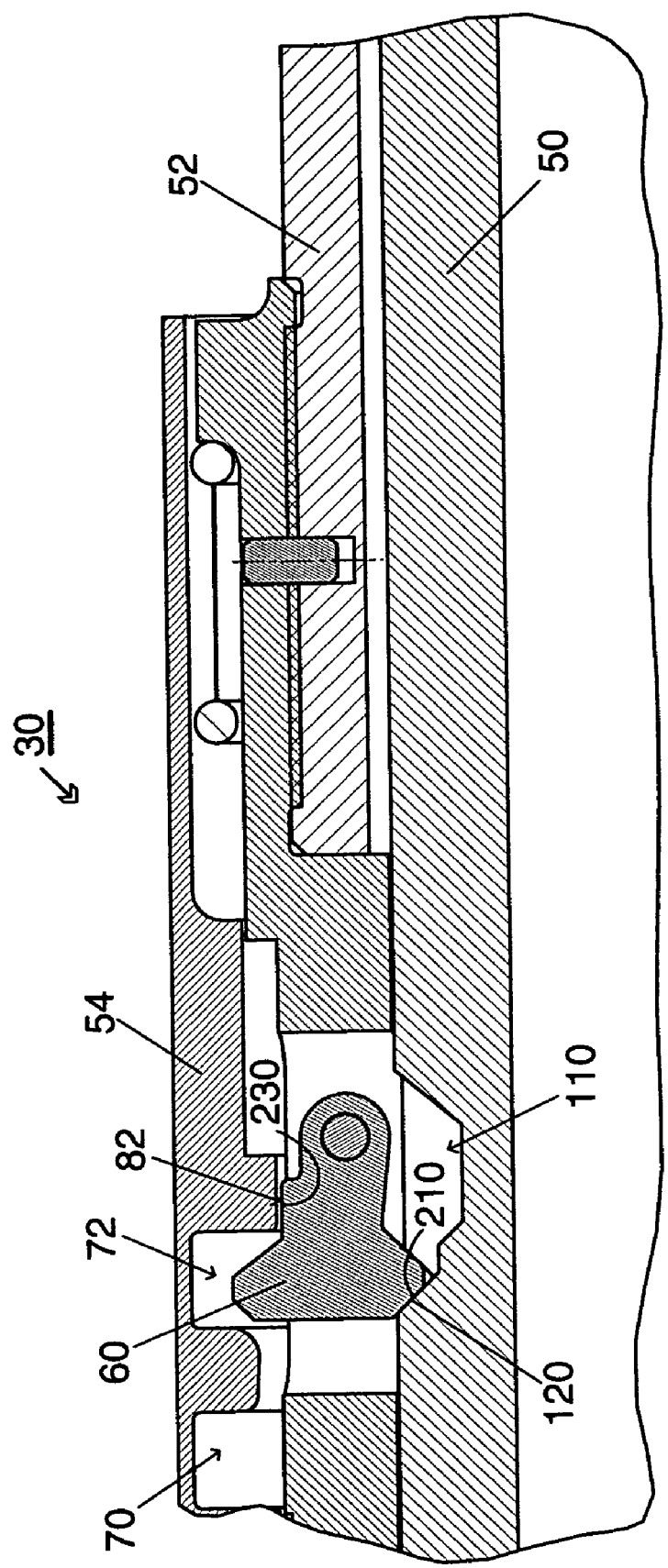

FIG. 12 illustrates that the compression load has moved inner member 50 further to the right on FIG. 11, with horizontal wall 82 engaging horizontal wall 230 and wall 120 engaging wall 210. In this position, hold open rod 30 is locked and release collar 54 cannot be moved until the compressive load is removed.

Figure 13:
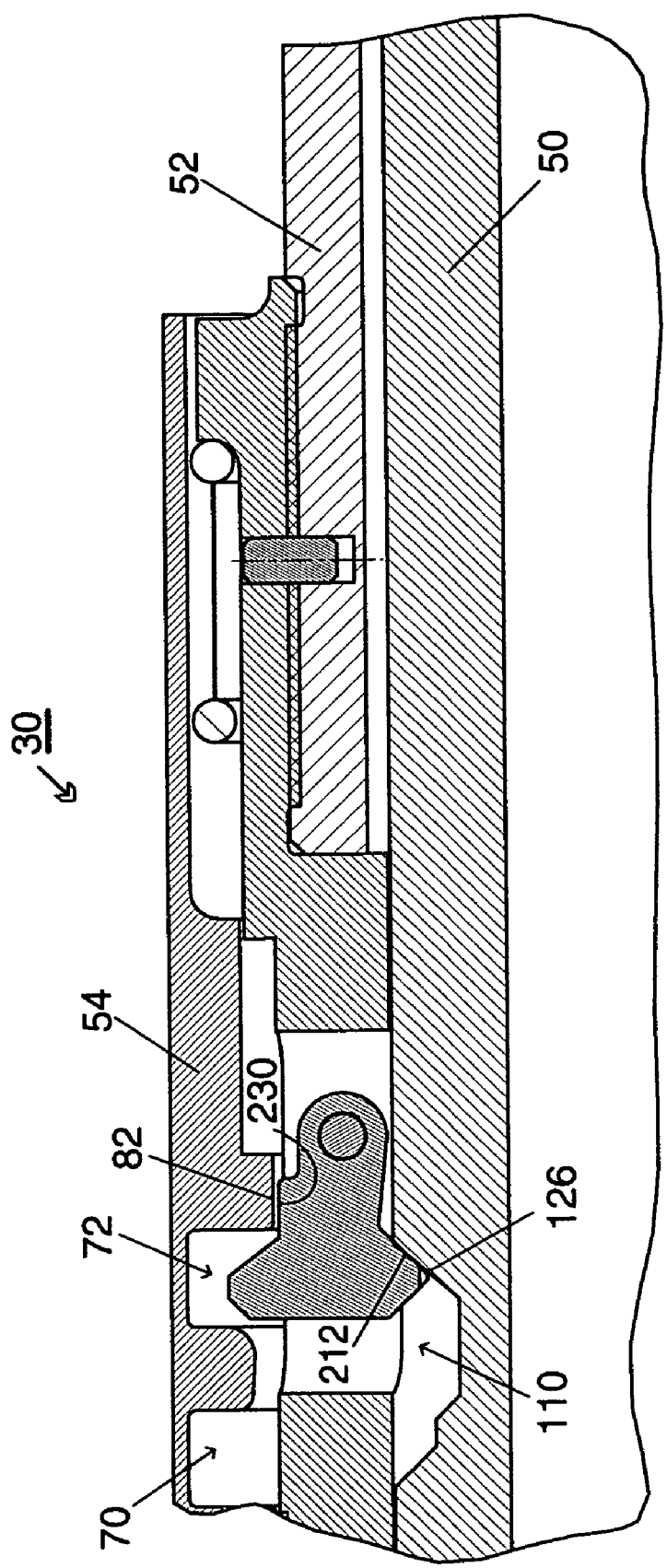

FIG. 13 illustrates that a tensile load has been applied to hold open rod 30 and has moved inner member 50 to the left on FIG. 13. Now, horizontal wall 82 is in engagement with horizontal wall 230 and wall 126 is in engagement with wall 212. Again, in this position, hold open rod 30 is locked and release collar cannot be moved until the tensile load is removed.

Figure 14:
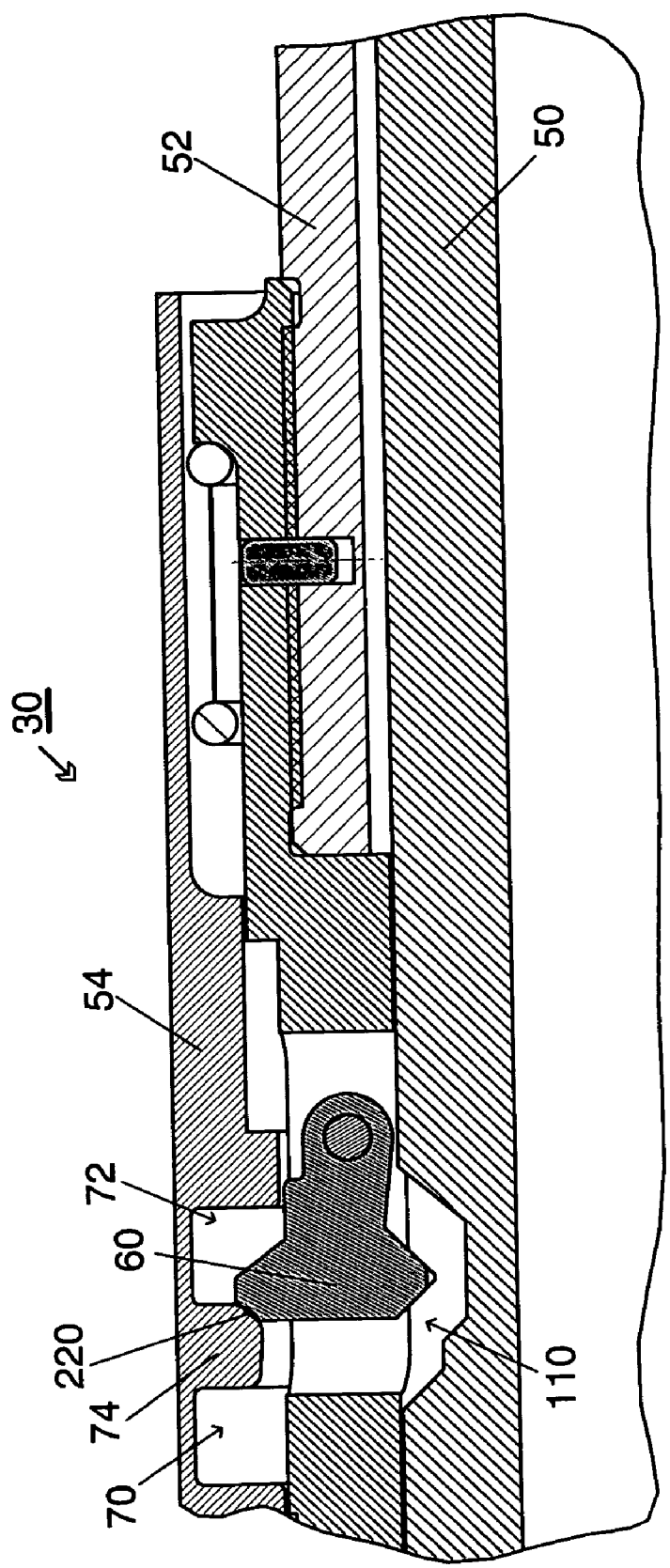

FIG. 14 illustrates that the loads have been removed, release collar is beginning to be moved to the right and wall 74 begins to engage wall 220 of pawl 60.

Figure 15:
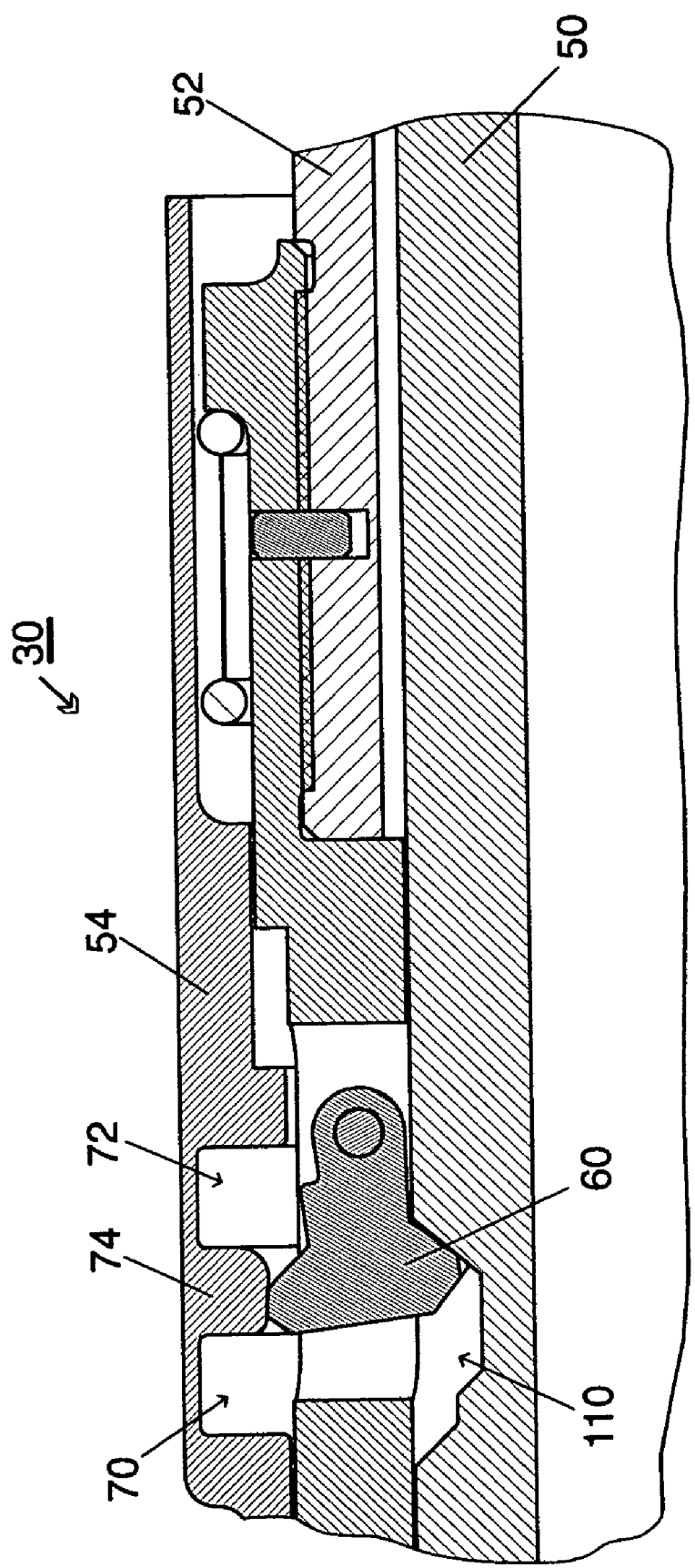

FIG. 15 illustrates that release collar 54 is moved further to the right and wall 74 pushes pawl 60 downwardly.

Figure 16:
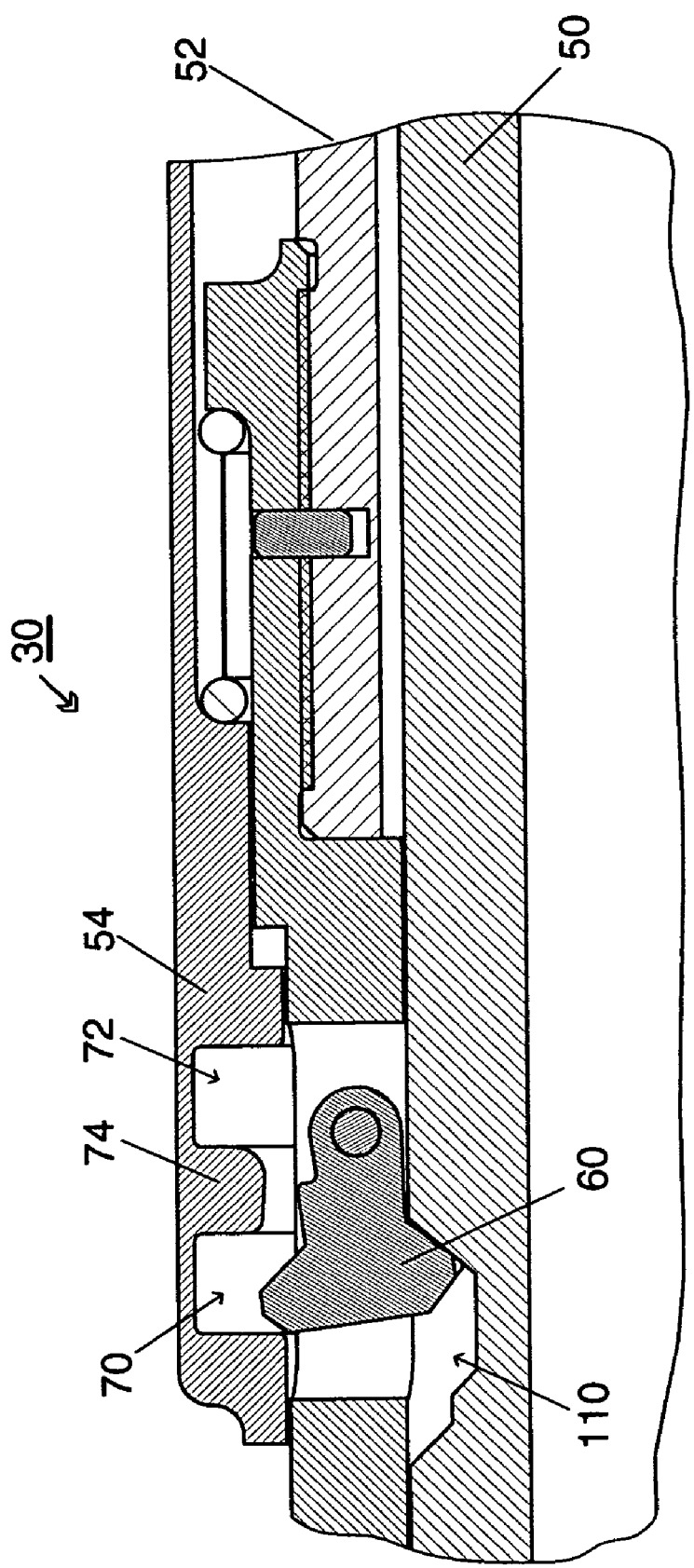

FIG. 16 illustrates that release collar 54 has been moved further to the right to the right and the top of pawl 60 begins to enter unlocked channel 70.

Figure 17:
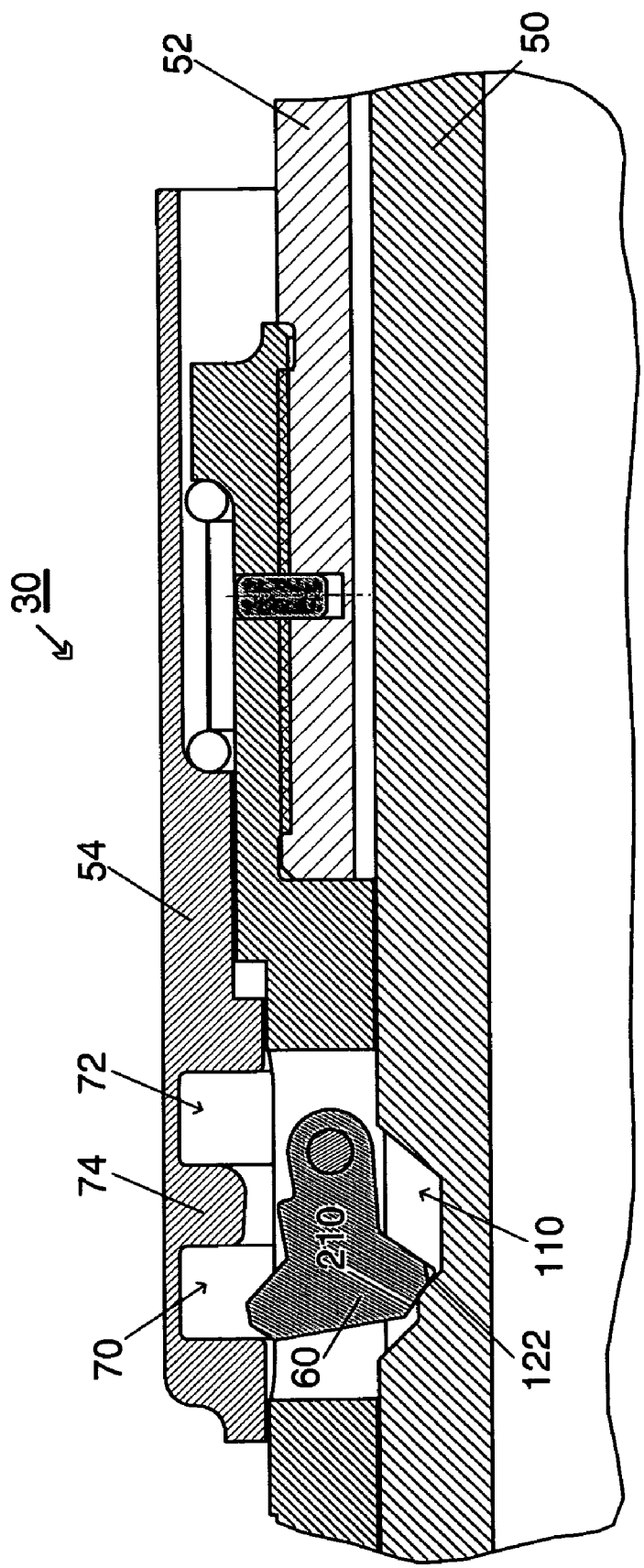

FIG. 17 illustrates that inner member 50 has been moved to the right on the figure, thus lifting pawl 60.

Finally, pawl 60 has been moved to its fully unlocked position shown on FIG. 1.

Figure 18:
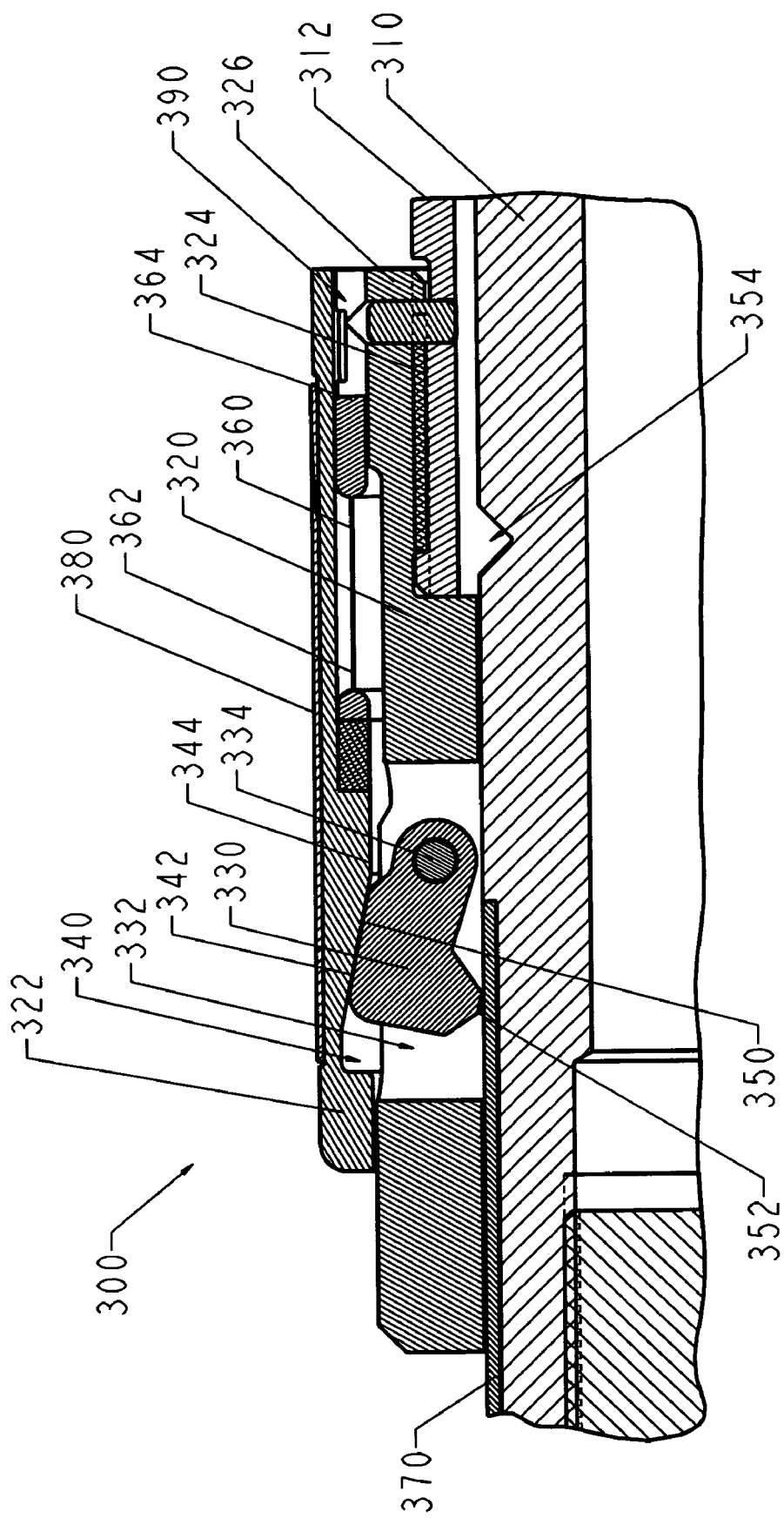
FIG. 18 is a fragmentary side elevational view of a further embodiment of the present invention.

FIG. 18 illustrates a hold open rod, constructed according to a further embodiment of the present invention, and generally indicated by the reference numeral 300.

Hold open rod 300 has elongated, horizontal, nested, cylindrical inner and outer members 310 and 312, respectively, and slidably mounted on a lock body 320, which is an extension of the outer member, is a horizontal cylindrical release collar 322. Lock body 320 is attached to outer member 312 by means of threads 324 augmented by a pin 326. Three pawls 330 (only one visible on FIG. 1), spaced 60 degrees apart, are rotatably disposed in outer member 312, each is disposed in a socket 332, and each is disposed on a shaft 334 journaled in lock body 320. Defined in release collar 322 is a circumferentially extending unlocking and locking channel 340 having a downwardly sloped surface 342 and a horizontal surface 344.

Pawl 330 has a flat upper surface 350 and a pointed lower end 352, the upper surface engaging downwardly sloped surface 342 and the pointed lower end being shaped complementary to the shape of depression 354 formed circumferentially around the outer periphery of inner tube 310. Hold open rod 300 is shown on FIG. 18 in its retracted and unlocked position.

Also shown on FIG. 18 is a left hand wound combination torsion and compression spring 360 having its ends bent such that end 362 is inserted into a hole formed in release collar 322 and end 364 is inserted into a slot 366 formed in lock body 320 (FIG. 26). It will be understood that, for clarity, torsion and compression spring 360 is shown as being in the same plane as pawl 330, although such may not always be the case. In the position shown on FIG. 18, point 352 of pawl 330 rests on a wear plate 370. A label 380 encircles an outer circumference of release collar 322 and a colored tape 390 is disposed in a groove encircling the inner periphery of lock body 320 to provide a visual indication that the release collar has been fully extended (FIG. 21).

Figure 19:
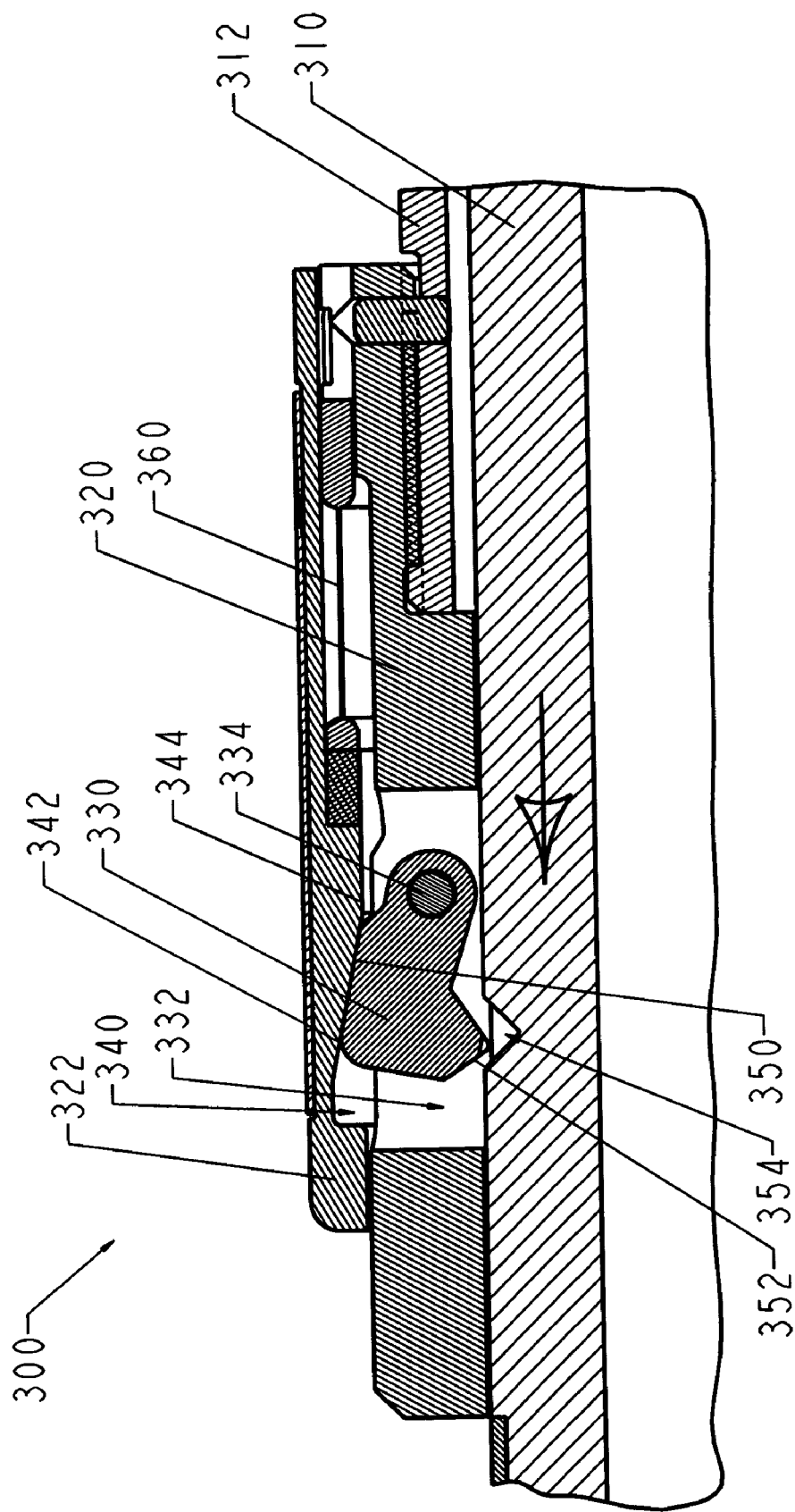
FIGS. 19-24 are fragmentary side elevational views, illustrating the steps in locking and unlocking the release collar for the embodiment of FIG. 18.

As illustrated on FIG. 19, hold open rod 300 is in an extended and unlocked position, with depression 354 under point 352 of pawl 330. Hold open rod 300 has been moved to this position by extending inner tube 310 in the direction of the arrow shown on FIG. 19.

Figure 20:
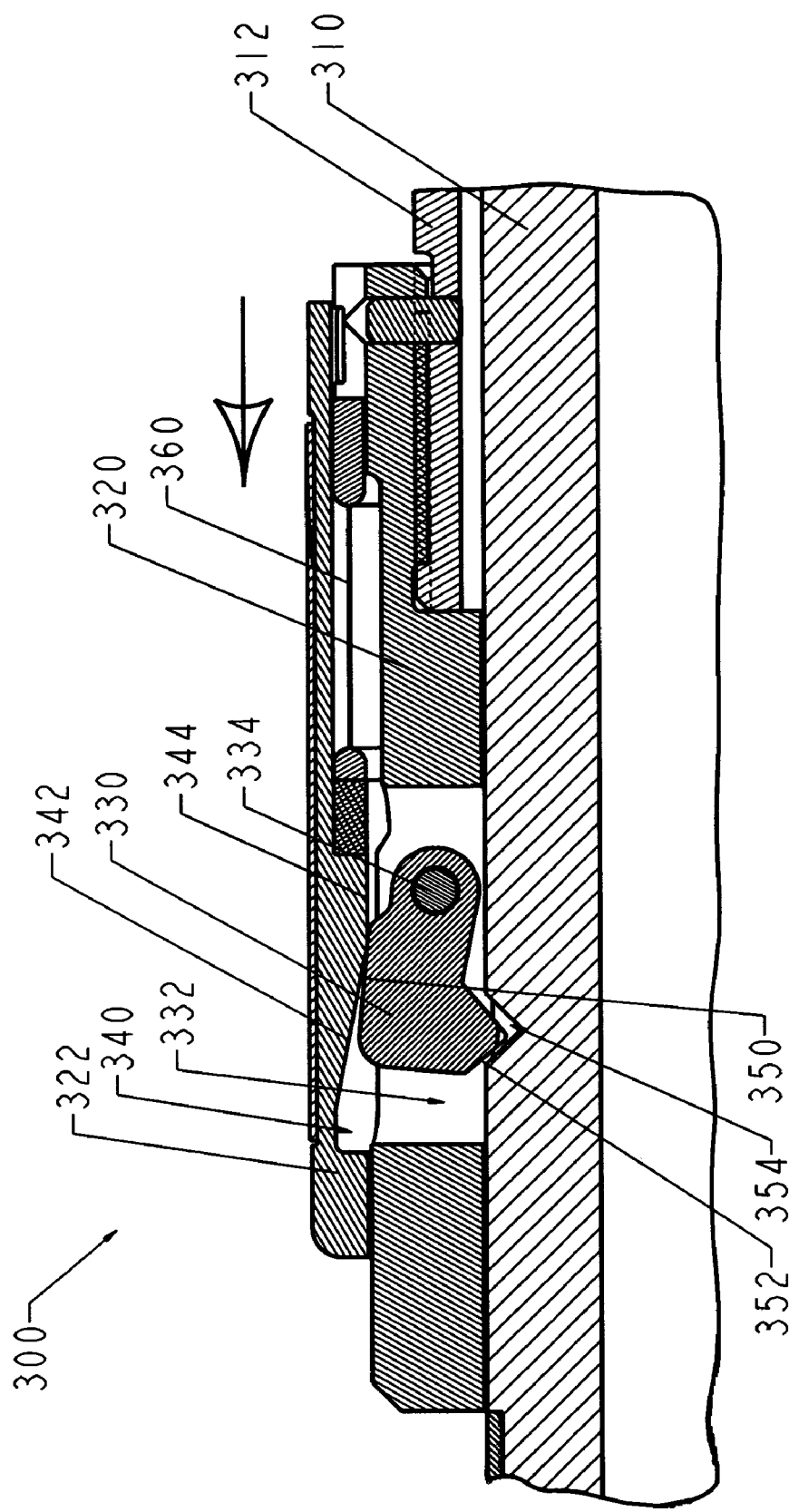

As illustrated on FIG. 20, hold open rod 300 is in an extended and still unlocked position, with spring 360 causing release collar to move in the direction shown by the arrow on FIG. 19 and the release collar to begin to push down pawl 330. To guide this movement, follower ball (FIG. 25) is moving to the left in the longitudinal portion of J-slot 402 (FIG. 26) formed in lock body 320.

Figure 21:
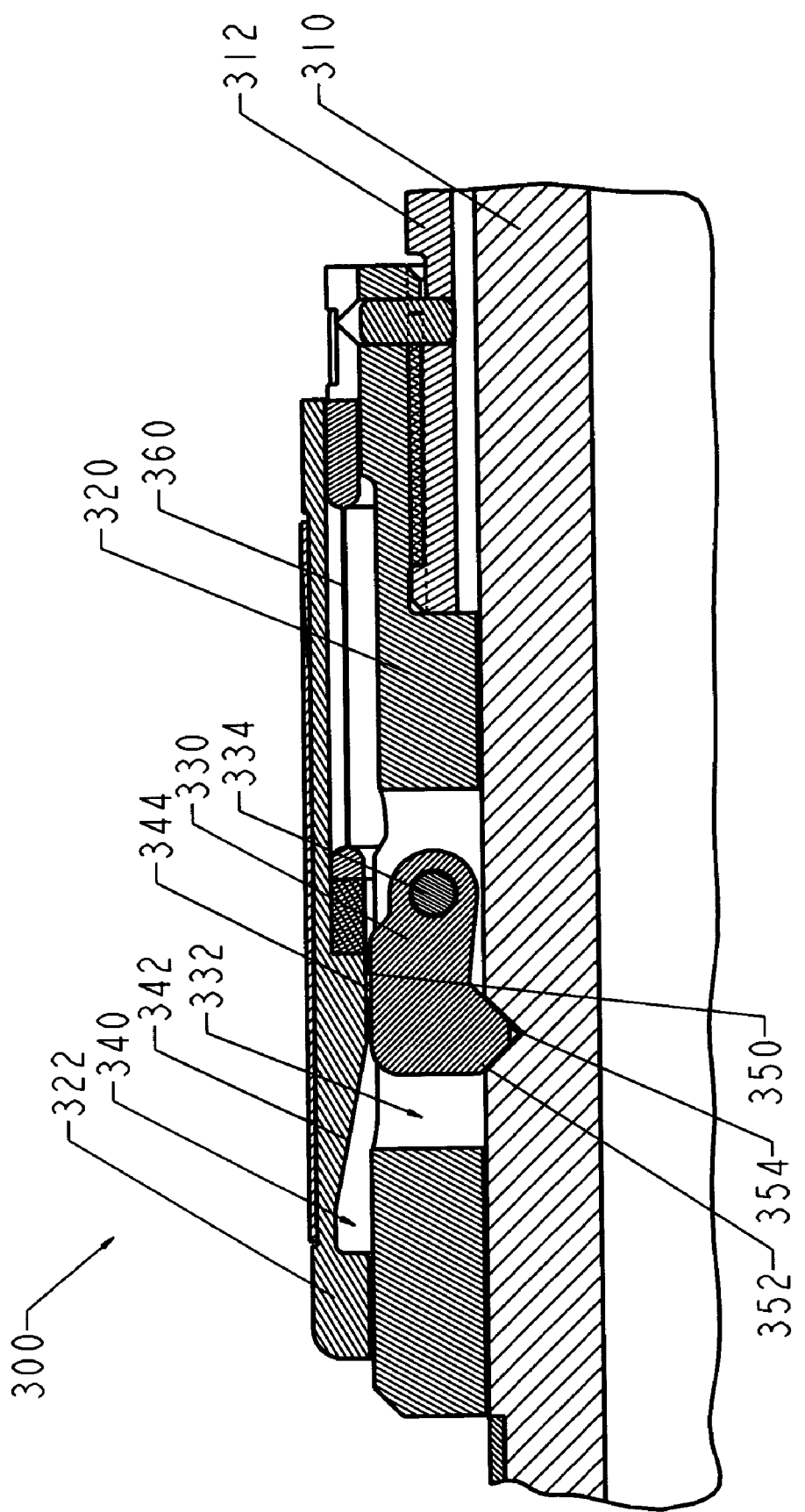

As illustrated on FIG. 21, hold open rod 300 is in its fully extended and locked position, with pawl 330 being pushed down into depression 354 by release collar 322 and with the upper surface 350 of the pawl engaging horizontal surface 344 of unlocking and locking channel 332. Upon reaching this point, follower ball 400 (FIG. 25), by virtue of torsion and compression spring 360, has snapped into the transverse portion of J-slot 402 (FIG. 26) and is held in the distal end of the transverse portion of the J-slot, thus preventing the collapse or extension of inner tube 310.

Figure 22:
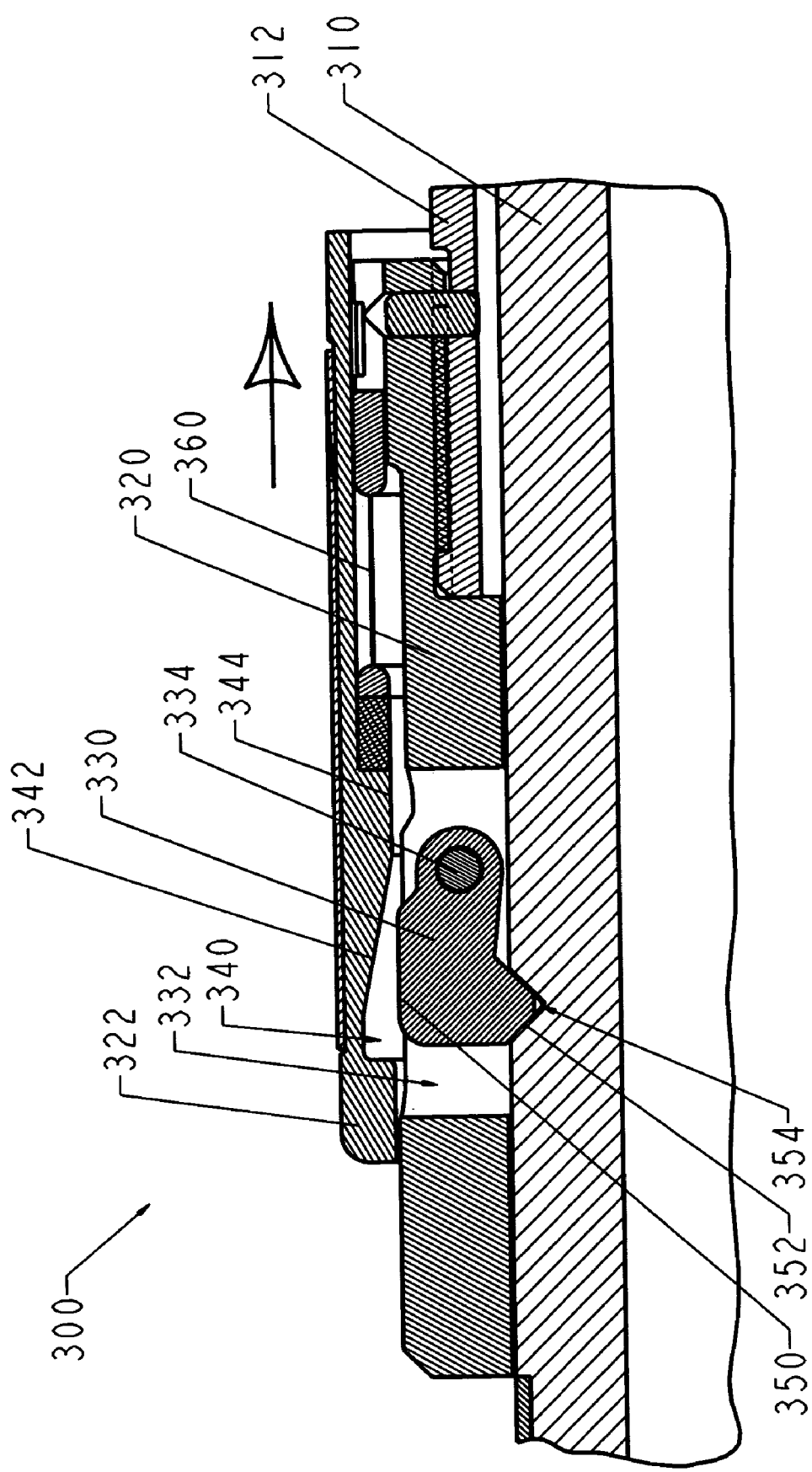

FIG. 22 illustrates the beginning of the collapse of inner tube 310 into outer tube 312. Here, release collar 322 has been manually rotated about thirty degrees, with the upper portion of the release collar being rotated toward the viewer. This moves follower ball 400 (FIG. 25) out of the transverse portion of J-slot 402 (FIG. 26) into the longitudinal portion of the J-slot. Further manual movement of release collar 322 causes follower ball 400 to move along the longitudinal portion of J-slot 402 to its distal end and pawl 330 to begin to be lifted up out of depression 354.

Figure 23:
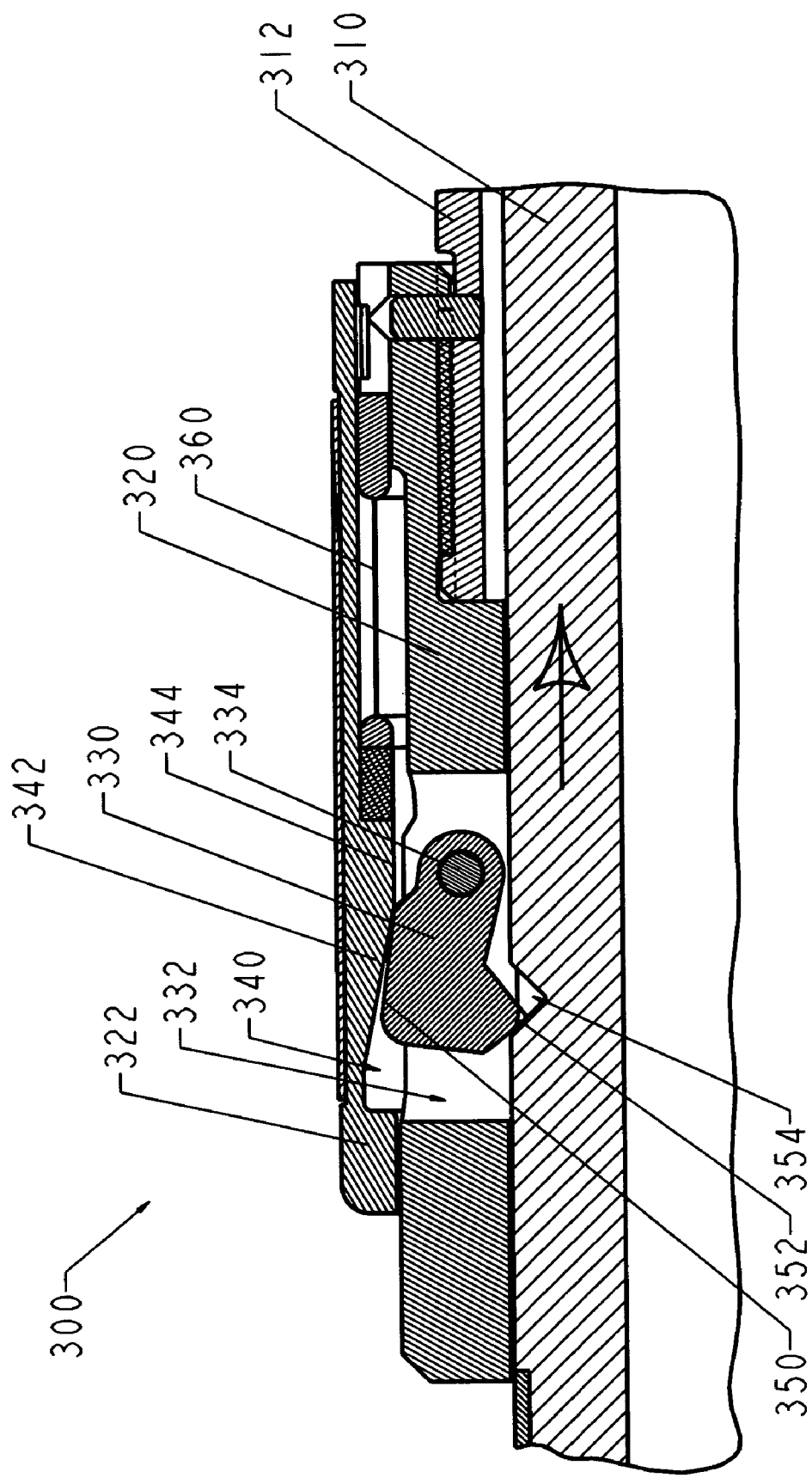
Figure 24:
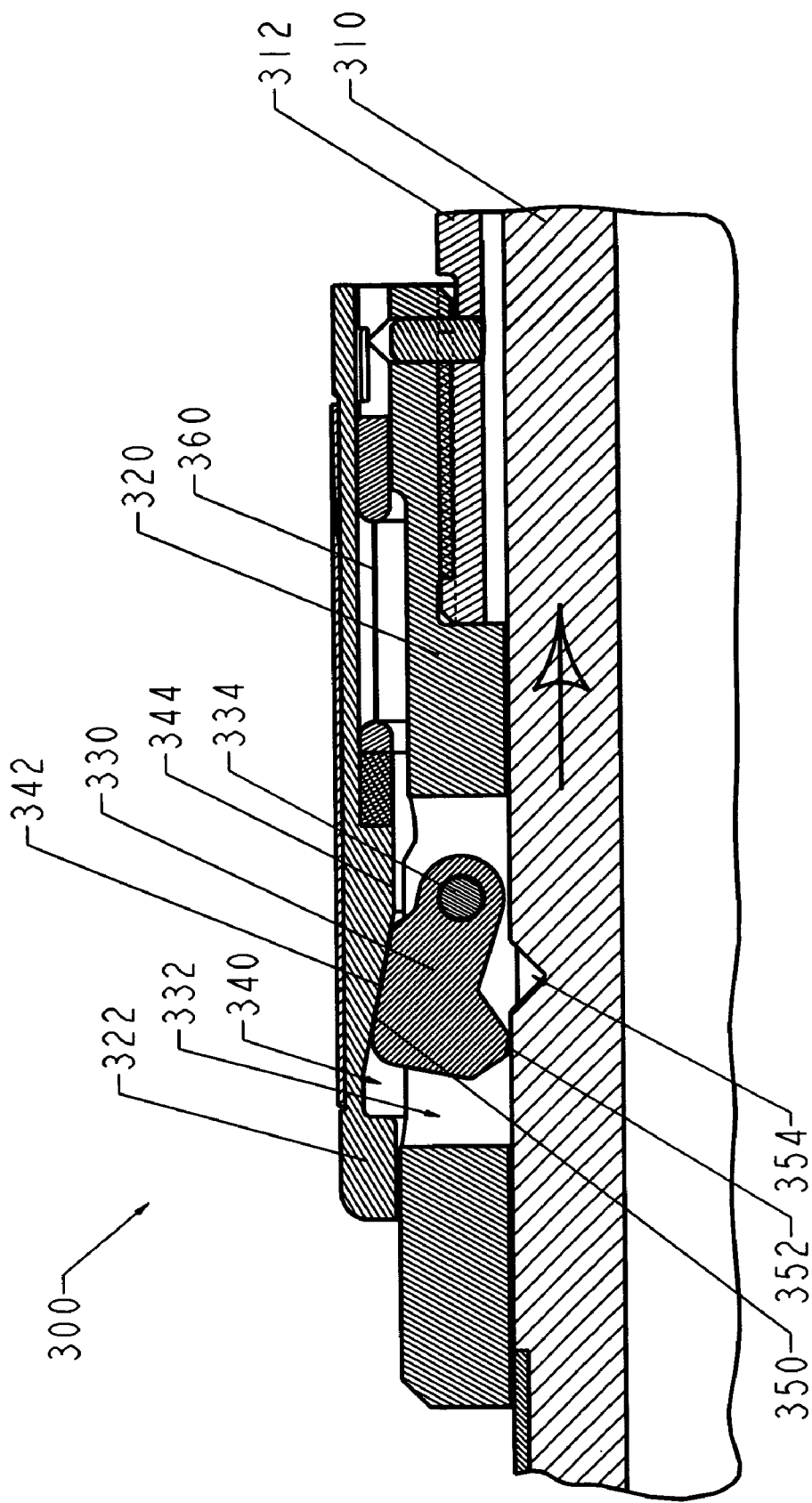

As illustrated on FIGS. 23 and 24 retraction of inner tube 310 into outer tube 312 in the direction of the arrows on FIGS. 23 and 24 causes pawl 330 to be lifted out of depression 354 and further retraction of the inner tube causes hold open rod 300 to return to the position shown on FIG. 18.

Figure 25:
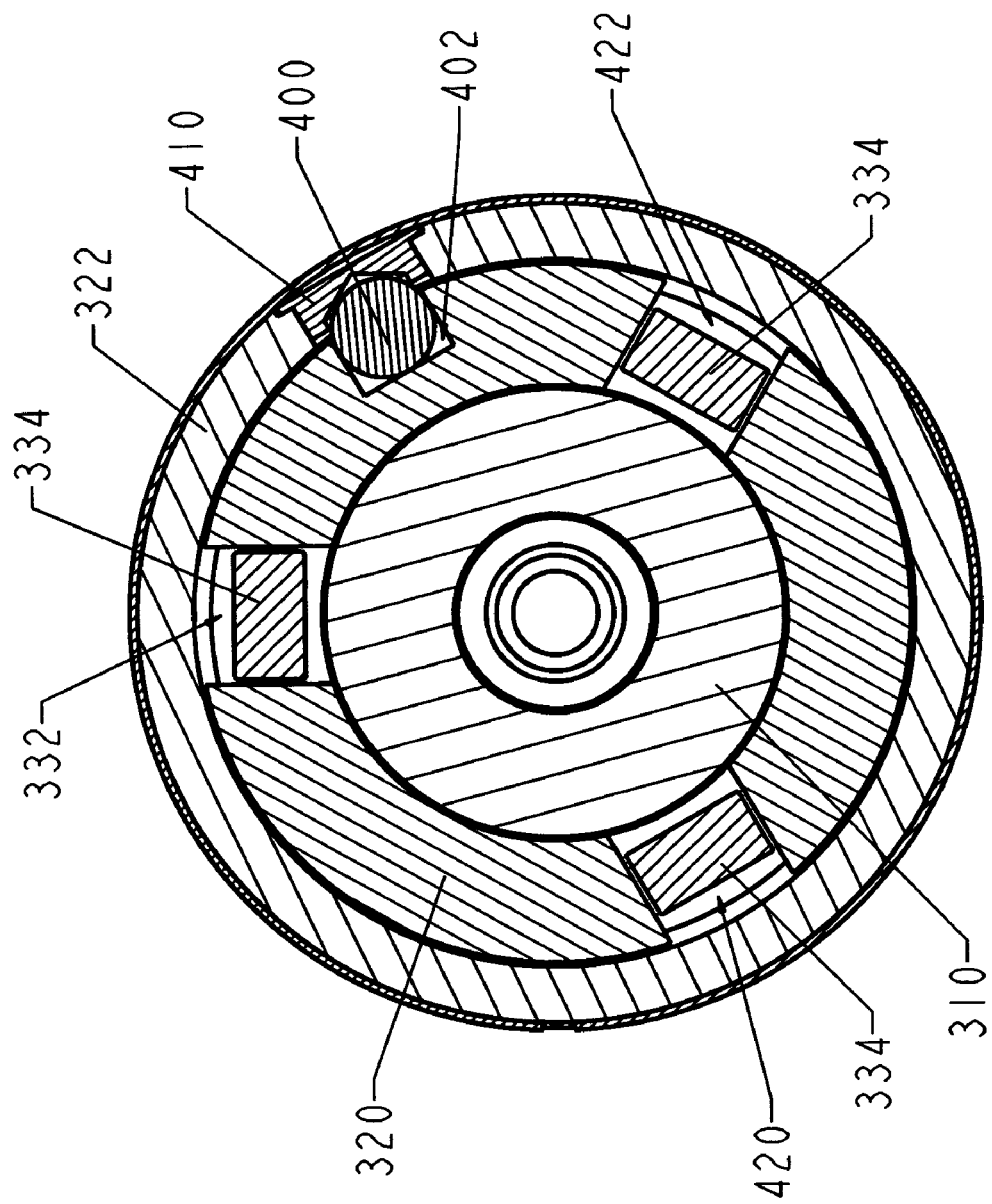
FIG. 25 is an end elevational view in cross-section of the follower ball of the embodiment of FIG. 18 in a J-slot.

As is illustrated on FIG. 25, the lower half of follower ball 400 rides in J-slot 402 (FIG. 26) while the upper half of the follower ball rides in an opening formed in release collar 322. Cap 410 is provided in release collar 322 to keep follower ball 400 from falling out. Also seen on FIG. 25 are openings 322, 420, and 422 for pawls 330.

As noted above with respect to FIG. 26, shown thereon are slot 366 and J-slot 402. Also seen on FIG. 26 are openings 322 and 422 for pawls 330 and openings 430 for shafts 334.

In the embodiments of the present invention described above, it will be recognized that individual elements and/or features thereof are not necessarily limited to a particular embodiment but, where applicable, are interchangeable and can be used in any selected embodiment even though such may not be specifically shown.

Spatially orienting terms such as "above", "below", "upper", "lower", "inner", "outer", "inwardly", "outwardly", "vertical", "horizontal", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention that, as a matter of language, might be said to fall therebetween.

The invention claimed is:

1. A telescoping hold open rod comprising:
    (a) telescoping inner and outer members;
    (b) a release collar circumferentially encircling said outer member;
    (c) at least one rotatably mounted pawl disposed in said outer member;
    (d) said at least one rotatably mounted pawl being depressed by said release collar into at least a first depression formed circumferentially in said inner member; and
    (e) said at least one rotatably mounted pawl being movable between unlocked and locked positions,
    (f) wherein said at least one rotatably mounted pawl is moved to the locked position by extending said inner member from said outer member and extending said release collar from an unlocked position to a locked position; and
    (g) wherein said release collar moves, from an unlocked position, in a longitudinal portion of a J-slot by virtue of a spring and then moves to a distal end of a transverse portion of said J-slot by virtue of said spring, to a locked position.

2. A telescoping hold open rod as defined in claim 1, wherein: said at least one rotatably mounted pawl, when in said locked position and a load is applied to said telescoping inner and outer members, prevents said release collar from being moved and prevents said telescoping inner and outer members from being moved, until said load is released.

3. A telescoping hold open rod as defined in claim 1, wherein: said at least one rotatably mounted pawl is moved between unlocking and locking channels defined in an inner circumference of said release collar.

4. A telescoping hold open rod as defined in claim 1, wherein: when a load applied to said telescoping inner and outer members is compressive and said at least one rotatably mounted pawl is in said locked position, a first surface of said at least one rotatably mounted pawl engages a surface of said release collar and a second surface of said at least one rotatably mounted pawl engages a first inwardly sloped surface of said at least a first depression.

5. A telescoping hold open rod as defined in claim 4, wherein: when said at least one rotatably mounted pawl is in said locked position, a portion of said at least one rotatably mounted pawl protrudes into a locking channel formed in an inner surface of said release collar.

6. A telescoping hold open rod as defined in claim 1, wherein: when a load applied to said telescoping inner and outer members is tensile and said at least one rotatably mounted pawl is in said locked position, a surface of said at least one rotatably mounted pawl engages a surface of said release collar and a second surface of said at least one rotatably mounted pawl engages a second inwardly sloped surface of said at least a first depression.

7. A telescoping hold open rod as defined in claim 6, wherein: when said at least one rotatably mounted pawl is in said locked position, a portion of said at least one rotatably mounted pawl protrudes into a locking channel formed in an inner surface of said release collar.

8. A telescoping hold open rod as defined in claim 1, wherein: when said at least one rotatably mounted pawl is in its said unlocked position, said at least one rotatably mounted pawl rests on a wear plate disposed on said inner member.

9. A telescoping hold open rod as defined in claim 1, wherein: extending said inner member positions said at least a first depression underneath said at least one rotatably mounted pawl.

10. A telescoping hold open rod as defined in claim 9, wherein: extending said release collar depresses said at least one rotatably mounted pawl into said at least a first depression.

11. A telescoping hold open rod as defined in claim 1, wherein: said inner and outer members cannot be moved relative to each other until said release collar is rotated.

12. A telescoping hold open rod as defined in claim 1, wherein: said motion of said release collar is automatic.

13. A telescoping hold open rod as defined in claim 1, further comprising:
    (a) a rod having an end engaging a surface of a connector fixedly attached to said outer member; and
    (b) biasing means disposed between said rod and said inner member to absorb vibrations when said inner and outer members are telescoped together.

14. A telescoping hold open rod comprising:
    (a) telescoping inner and outer members;
    (b) a release collar circumferentially encircling said outer member;
    (c) at least one rotatably mounted pawl disposed in said outer member;

(d) said at least one rotatably mounted pawl being depressed by said release collar into at least a first depression formed circumferentially in said inner member; and (e) said at least one rotatably mounted pawl being movable between unlocked and locked positions, (f) wherein said at least one rotatably mounted pawl is moved to the locked position by extending said inner member from said outer member and extending said release collar from an unlocked position to a locked position;

(g) wherein said release collar is rotated from a distal end of a transverse portion of a J-slot to a longitudinal portion of said J-slot; and (h) wherein said inner and outer members cannot be moved relative to each other until said release collar is rotated.

15. A telescoping hold open rod comprising:

(a) a rod engaging a surface of an end connector fixedly attached to an outer member and an inner member; and (b) biasing means disposed between said rod and said inner member to absorb vibrations when said inner and outer members are telescoped together;

(c) a release collar circumferentially encircling said outer member;

(d) at least one rotatably mounted pawl disposed in said outer member;

(e) said at least one rotatably mounted pawl being depressed by said release collar into at least a first depression formed circumferentially in said inner member; and (f) said at least one rotatably mounted pawl being movable in a first direction between unlocked and locked positions and being movable in a direction opposite to the first direction between locked and unlocked positions, and (h) wherein said release collar moves, from the unlocked position, in a longitudinal portion of a J-slot by virtue of a spring and then moves to a distal end of a transverse portion of said J-slot by virtue of said spring, to the locked position.

16. A telescoping hold open rod as defined in claim 15, wherein: when said at least one rotatably mounted pawl is in the locked position and a load is applied to said telescoping inner and outer members, a first surface of said at least one rotatably mounted pawl engages a surface of said release collar and a second surface of said at least one rotatably mounted pawl engages an inwardly sloped surface of the at least a first depression in said inner member.

17. A telescoping hold open rod comprising:

(a) telescoping inner and outer cylindrical members;

(b) a cylindrical release collar circumferentially encircling and slidable on said outer cylindrical member;

(c) three rotatably mounted pawls disposed in said outer cylindrical member;

(d) said three rotatably mounted pawls being depressable by said cylindrical release collar to move into at least a first depression formed circumferentially in said inner cylindrical member;

(e) said three rotatably mounted pawls being movable by said cylindrical release collar in a first direction between unlocked and locked positions and being movable in a direction opposite to the first direction between locked and unlocked positions;

(f) a rod engaging a surface of an end connector fixedly attached to said outer cylindrical member of said telescoping inner and outer cylindrical members; and (g) biasing means disposed between said rod and said inner cylindrical member to absorb vibrations when said inner and outer cylindrical members are telescoped together, and (h) wherein said release collar moves, from the unlocked position, in a longitudinal portion of a J-slot by virtue of a spring and then moves to a distal end of a transverse portion of said J-slot by virtue of said spring, to the locked position.

* * * * *

UNITED STATES PATENT AND TRADEMARK OFFICE
CERTIFICATE OF CORRECTION

PATENT NO. : 7,654,371 B1 Page 1 of 1
APPLICATION NO. : 11/155921
DATED : February 2, 2010
INVENTOR(S) : Metz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1230 days.

Signed and Sealed this

Twenty-third Day of November, 2010

David J. Kappos
*Director of the United States Patent and Trademark Office*